(12) United States Patent
Hagnestål

(10) Patent No.: US 11,728,717 B2
(45) Date of Patent: Aug. 15, 2023

(54) AZIMUTHAL OR POLODIAL FLUX MACHINES

(71) Applicant: Hagnesia AB, Hindås (SE)

(72) Inventor: Anders Hagnestål, Hindås (SE)

(73) Assignee: Hagnesia AB, Hindås (SE)

(*) Notice: Subject to any disclaimer, the term of this patent is extended or adjusted under 35 U.S.C. 154(b) by 149 days.

(21) Appl. No.: 17/428,044

(22) PCT Filed: Mar. 3, 2020

(86) PCT No.: PCT/SE2020/050234
§ 371 (c)(1),
(2) Date: Aug. 3, 2021

(87) PCT Pub. No.: WO2020/180234
PCT Pub. Date: Sep. 10, 2020

(65) Prior Publication Data
US 2022/0103056 A1    Mar. 31, 2022

(30) Foreign Application Priority Data

Mar. 4, 2019 (SE) .................................. 1950276-4

(51) Int. Cl.
H02K 41/03       (2006.01)
H02K 1/17        (2006.01)
H02K 1/18        (2006.01)

(52) U.S. Cl.
CPC ............. *H02K 41/031* (2013.01); *H02K 1/17* (2013.01); *H02K 1/182* (2013.01); *H02K 2201/12* (2013.01)

(58) Field of Classification Search
CPC ...... H02K 1/17; H02K 1/182; H02K 2201/12; H02K 41/031; H02K 55/02;
(Continued)

(56) References Cited

U.S. PATENT DOCUMENTS 3,699,365 A * 10/1972 Leitgeb .................. H02K 41/03
                                                310/12.24
2009/0309463 A1* 12/2009 Ritz, Jr. ................. H02K 1/141
                                                310/179
(Continued)

FOREIGN PATENT DOCUMENTS

CN        101660481 A     3/2010
CN        104578672 A     4/2015
(Continued)

OTHER PUBLICATIONS

Supplementary European Search Report completed Oct. 20, 2022 in corresponding European Patent Application No. 20 76 6780 (3 pages).

(Continued)

*Primary Examiner* — Naishadh N Desai
(74) *Attorney, Agent, or Firm* — Fox Rothschild LLP; Carol E. Thorstad-Forsyth

(57) ABSTRACT

An electrical machine (1) operating by switching of magnetic flux comprises a first magnetic structure (10), a second magnetic structure (20) and a winding (30). The first and second magnetic structures are arranged movable relative to each other along a predetermined motion path (4) and have respective sections (12,22) interleaved with each other via more than 4 air gaps. The first magnetic structure presents at each air gap a variable magnetic permeability. The second magnetic structure presents at each air gap a variable magnetic permeability and/or permanent magnet poles. Magnetic periodicities of the first and second magnetic structures are equal. For each of the air gaps, most of the magnetic flux passes at each instant in the same direction. The winding has a respective loop (32) provided either around respective section in the direction of the predetermined motion path, or (Continued)

along respective section along an entire closed predetermined motion path.

20 Claims, 13 Drawing Sheets

(58) Field of Classification Search
CPC ........... H02K 2201/03; H02K 2201/15; H02K 26/00; H02K 3/521; H02K 41/02; H02K 41/03; H02K 7/088; H02N 2/08; Y02E 10/00; Y02E 40/60
See application file for complete search history.

(56) References Cited

U.S. PATENT DOCUMENTS

| | | | |
|---|---|---|---|
| 2015/0340912 A1* | 11/2015 | Calley | H02K 1/145 310/216.003 |
| 2016/0226357 A1* | 8/2016 | Rozinsky | H02K 41/031 |
| 2017/0047821 A1* | 2/2017 | Klassen | H02K 1/24 |

FOREIGN PATENT DOCUMENTS

| | | |
|---|---|---|
| CN | 105186832 B | 6/2017 |
| DE | 102014213276 | 1/2016 |
| EP | 3325800 A1 | 5/2018 |
| JP | 2002027729 A | 1/2002 |
| JP | 2018524964 A | 8/2018 |
| WO | 2006/063985 | 6/2006 |
| WO | 2017012814 A1 | 1/2017 |

OTHER PUBLICATIONS

Hagnestal, Anders and Erling Guldbrandzen "A Highly efficient and low-cost linear TFM generator for wave power." EWTEC 2017: The 12th European Wave and Tidal Energy Conference Aug. 27-Sep. 2017, Cork, Ireland. European Wave and Tidal Energy Conference, 2017.
Hagnestal, A. 2016, "A low cost and highly efficient TFM generator for wave power," The 3rd Asian Wave and Tidal Energy Conference AWTEC, pp. 822-828.
Hagnestal, A., 2018, "On the optimal Pole Width for Direct Drive Linear Wave Power Generators Using Ferrite Magnets," Energies, 11(6).

* cited by examiner

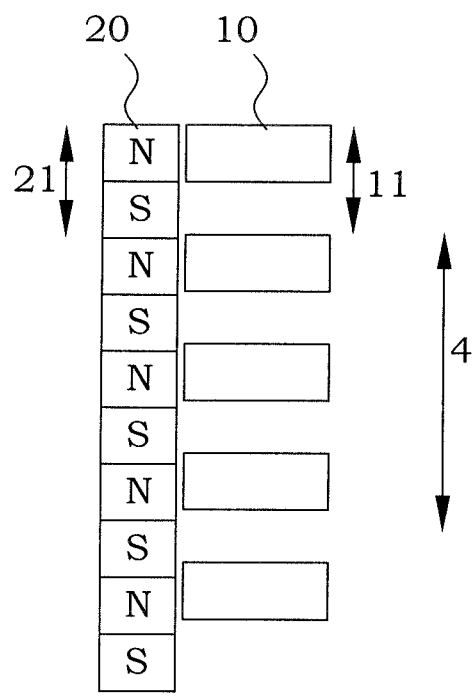
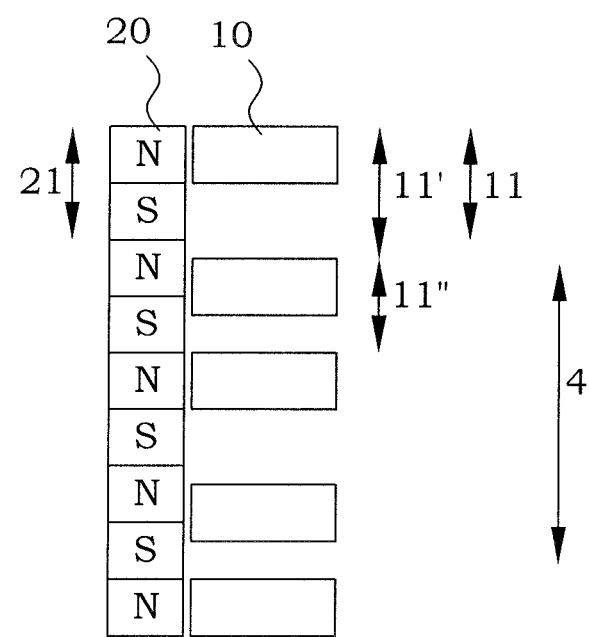
Fig. 2A                Fig. 2B
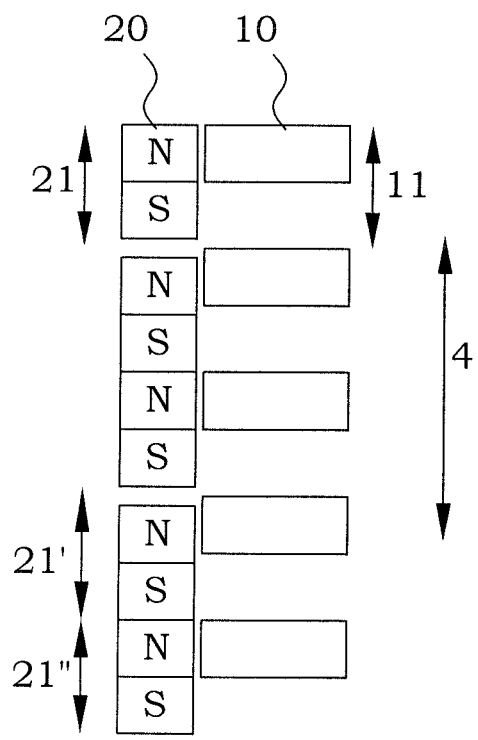
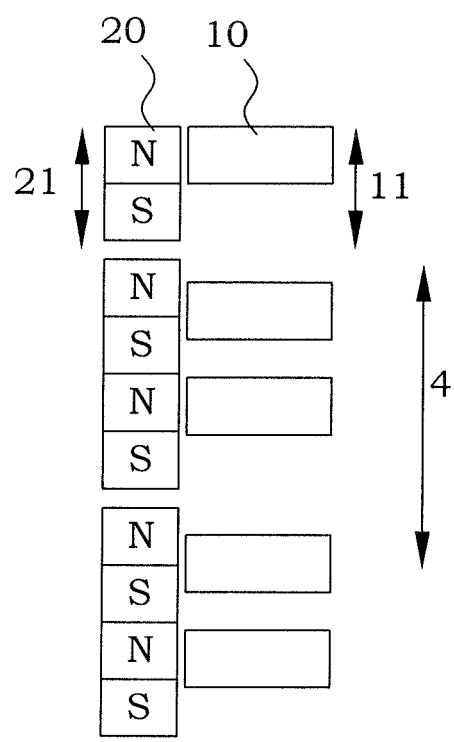
Fig. 2C                Fig. 2D Fig. 14
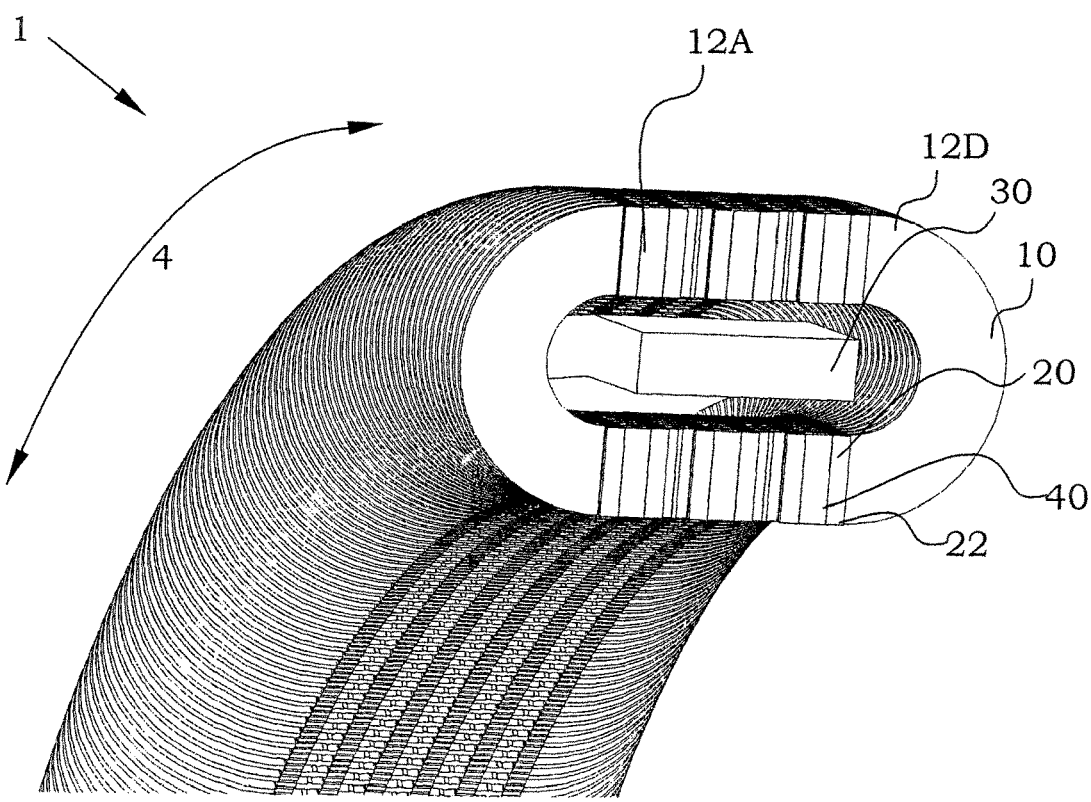
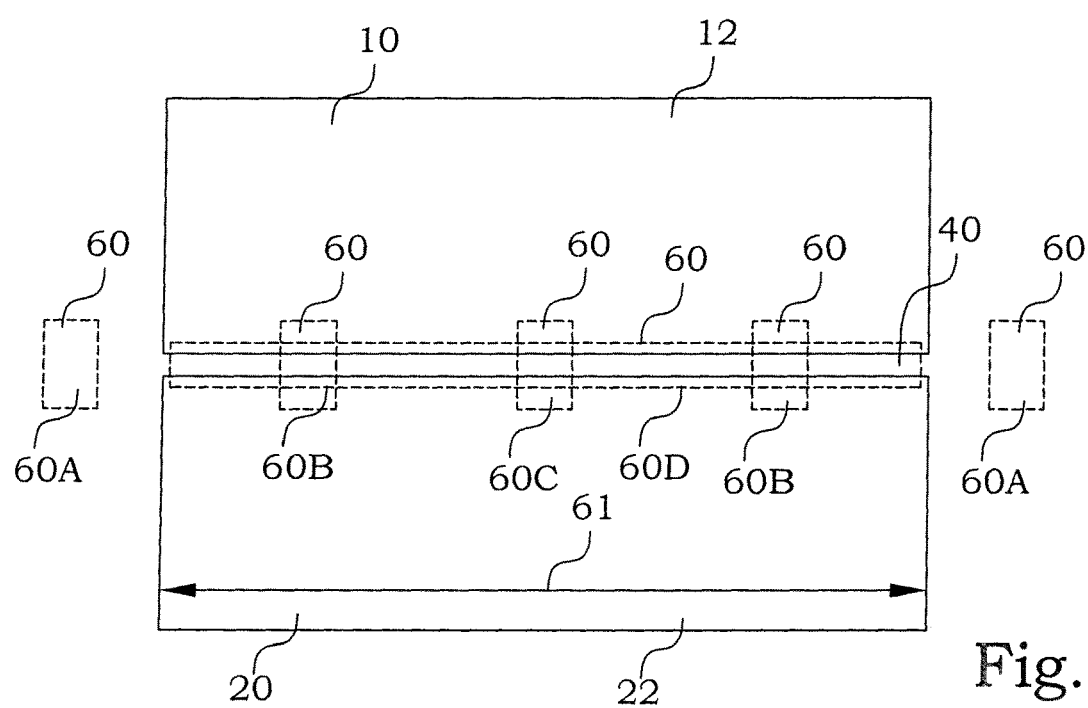
Fig. 15

AZIMUTHAL OR POLODIAL FLUX MACHINES

CROSS-REFERENCE TO RELATED APPLICATIONS

The present application is a U.S. National Phase of International Patent Application No. PCT/SE2020/050234 which was filed on Mar. 3, 2020 and claims priority to Swedish Patent Application No. 1950276-4 which was filed on Mar. 4, 2019. The contents of the listed patent documents are incorporated herein by reference in their entireties.

TECHNICAL FIELD

The present invention relates in general to electrical machines and in particular to variable reluctance machines.

BACKGROUND

The concept of electrical machines is well known and the first types of electrical machines such as the induction machine and the synchronous machine that were invented in the late 19:th century are still very important in the industry today. Electric machines generally comprises one movable part, typically but not restricted to a rotor or a translator, and a second part, typically but not restricted to a stator. These parts are separated by an airgap, which separates the movable part and the second part. At least one of the parts, typically the stator, also has an electric winding which can carry an electric current.

Characterizing for electric machines is that they have low force or torque densities compared to mechanical systems such as gear boxes, hydraulic systems and pneumatic systems, but has high power densities since they can operate at high speed. A power density of 1 kW/kg is a representative number for an electric motor.

Characterizing for most electrical machines is also that the resistive power losses, which often constitute the majority of the losses in the electric machine, are independent on the airgap speed v if the eddy currents in the winding are neglected. However, counted in percent of the total power, the resistive power losses become proportional to 1/v since the total power is proportional to v. Thereby, general electric machines typically have high efficiencies at high speeds in the range 10-100 m/s, where efficiencies in the range of 90-98% are common. At low speeds, e.g. below 5 m/s, electrical machines typically have lower efficiencies.

Also, the resistive losses typically create a thermal problem in the electric machine, and limit the torque and force density as well as the power density for operations longer than a few seconds.

Due to the low force or torque density and poor low speed efficiency, electric machines are often used in combination with gear boxes, hydraulic systems or pneumatic systems in applications requiring high torque or force and low speed. This enables the electric machine to operate at high speed and low torque. These mechanical systems, however, have certain drawbacks. The mechanical conversion generates extra losses in the system, which are typically 3-20% depending on the system and even higher in partial load. The mechanical conversion system also requires maintenance to a larger extent than the electrical machine itself, which can increase the overall cost. As an example, for wind power, maintenance problems with the gear boxes have been a continuous large problem for the last 20 years.

To get around the low speed efficiency problem and the low force density problem, a number of different machine types belonging to the family of machines known as variable reluctance machines (VRM) and especially variable reluctance permanent magnet machines (VRPM) has been proposed and developed. These machine types, for example the Vernier machine (VM), the Vernier hybrid machine (VHM) and different variants of the transverse flux machines (TFM) implement a geometrical effect known as magnetic gearing, which lowers the winding resistance grossly by making the winding shorter and thicker. This is accomplished by arranging the geometry so that the flux from several adjacent poles goes in the same direction and so that the flux from these poles switches direction when the movable part, i.e. translator or rotor, is moved one pole length.

These machines also develop a higher shear stress than other machines, where shear stress is defined as the useful shear force per unit airgap area. They, however, do not in general increase the amount of airgap area packed in per unit volume much compared to standard machines, so although the force density of these machines is increased, it is only moderately. A well-known problem with these machine types is that the leakage magnetic flux becomes large, and that the power factor becomes low at full load. Thereby, they cannot both have a high power factor and a very high shear stress. Although they have been proposed for wind power, they have not reached a wide-spread market penetration due to these drawbacks.

One type of TFM machine has been proposed in references [1-4]. This machine has the advantage that it does pack in considerable airgap area per unit volume. However, the machine looks like a transformer split in two and has the coils far away from the airgaps in up to two massive coils per phase. Unfortunately, this design also has some minor drawbacks. The proposed design gives a large magnetic leakage flux, which results in a low power factor. Also, it has a large clamping magnetic normal force that requires a strong mechanical structure to hold the core. This is due to the fact that coils are wound around two structures only, and that these two structures are located far away from some of the air gaps.

A problem with prior art electrical machines is that in low speed applications and in applications where high force or torque densities are required, the current solutions cannot reach very high torque or force densities, and the most torque dense machines have a low power factor at full load. This results in large and expensive direct drive machines which often have considerable losses.

SUMMARY

A general object of the presented technology is therefore to provide electrical machines having improved general torque or force density and increased low speed efficiency.

The above object is achieved by devices according to the independent claims. Preferred embodiments are defined in dependent claims.

In general words, in a first aspect, an electrical machine operating by switching of magnetic flux comprises a first magnetic structure, a second magnetic structure and a winding. The first and second magnetic structures are arranged movable relative to each other along a predetermined motion path. The first and second magnetic structures have, along a closed path perpendicular to the predetermined motion path, respective sections interleaved with each other via more than 4 air gaps, parallel to the predetermined motion path. Each section is defined as the part of the respective magnetic structure situated between, as seen along the direction of the closed path, section surfaces facing two consecutive ones of the more than 4 air gaps. For each section of the magnetic structures, magnetic field lines go through magnetic material between the section surfaces. The first magnetic structure presents, in a direction parallel to the predetermined motion path at each air gap, a variable magnetic permeability. The second magnetic structure presents, in the direction parallel to the predetermined motion path at each air gap a variable magnetic permeability, permanent magnet poles, and/or magnetic poles comprising superconducting material. A first average distance determined as an average distance between consecutive maxima of the variable magnetic permeability of a section of the first magnetic structure is equal, within 35%, to a second average distance determined as an average distance between consecutive maxima of the variable magnetic permeability of a neighbouring section of the second magnetic structure or as an average distance between consecutive magnetic poles of a same polarity of the neighbouring section of the second magnetic structure. For each of the more than 4 air gaps, at at least one position at at least one operation phase, an average of a component of the magnetic flux density normal to the section surface at an airgap is larger than 15% of an average of an absolute value of the component of the magnetic flux density normal to the section surface. The averages are to be taken over a uniform-flux distance, where the uniform-flux distance is an integer, larger than 3, times the first average distance along the respective air gap in the direction of the predetermined motion path. For at least three of the sections of the magnetic structures, the winding has a respective loop provided either around respective section for at least the uniform-flux distance in the direction of the predetermined motion path, or along respective section along an entire closed said predetermined motion path.

In a second aspect, a system comprises an electrical machine according to the first aspect. The system is a renewable energy conversion system, a wind power plant, an ocean wave power plant, an electric ship propulsion system, a gearless motor, a direct drive system or a force dense actuator.

One advantage with the proposed technology is that it increases the force or torque density of the machine and increase its efficiency, especially at low speed. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIGS. 2A-D are schematic illustrations of embodiments of geometrical relationships between first and second magnetic structures;

FIG. 14 is a schematic illustration of parts of another embodiment of first and second magnetic structures and windings of a poloidal flux machine with parts cut-away; and FIG. 15 is a schematic illustration of embodiments of bearing placements in an electrical machine.

DETAILED DESCRIPTION

Figure 1A:
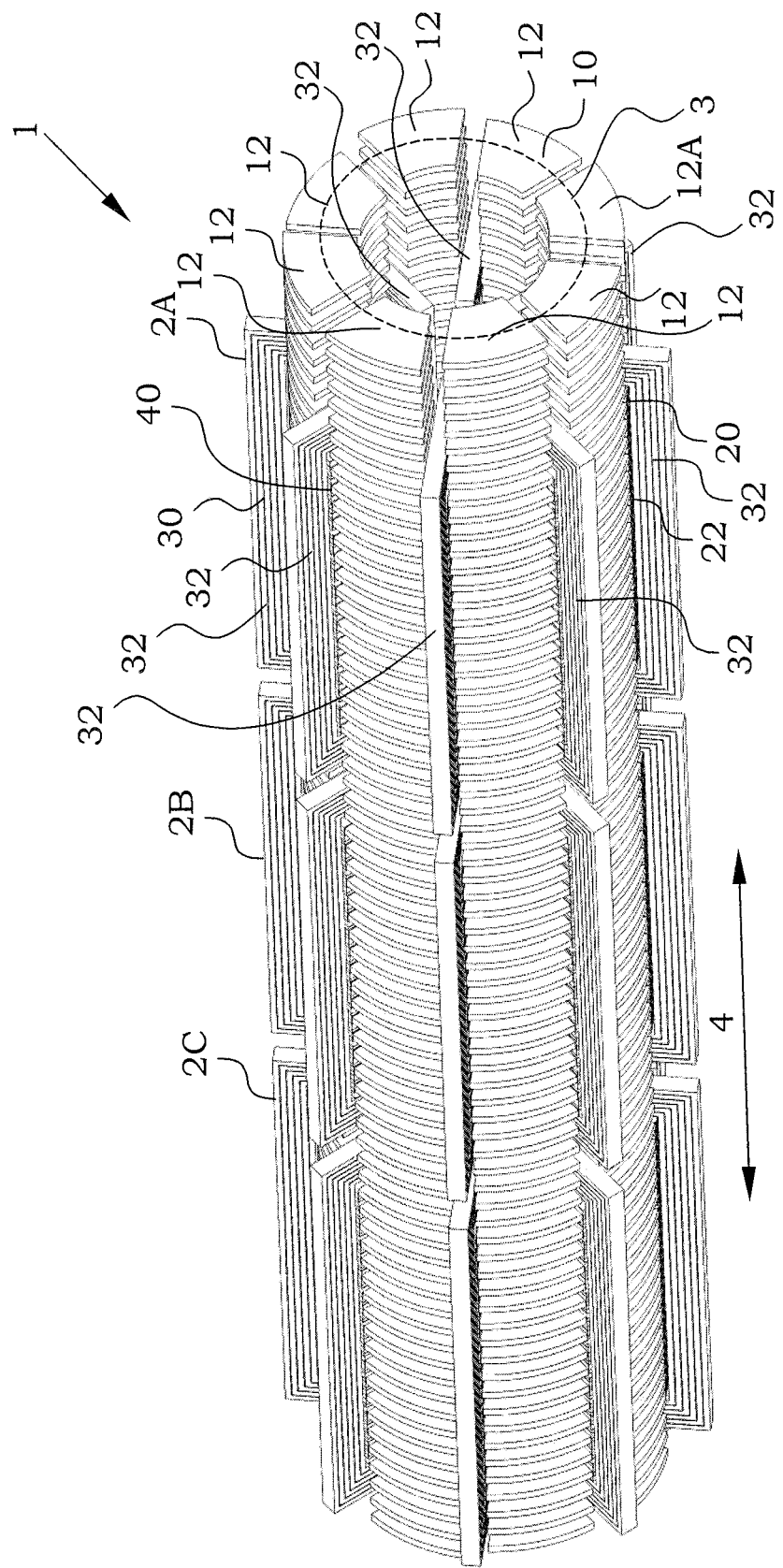
FIG. 1A is an illustration of an embodiment of an electrical machine operating by switching of magnetic flux.

Throughout the drawings, the same reference numbers are used for similar or corresponding elements.

The technology presented here provides an elegant solution to both the general torque or force density problem of electric machines and the low speed efficiency problem by having extremely high torque or force density, very high efficiency even at low speed and by retaining a decent power factor. This is accomplished by preferably considering three different aspects. These concepts will in turn give the frames within which the design and the geometrical features have to follow.

The winding resistance is often a major drawback. To have a many times lower winding resistance, the technology presented here implements so-called magnetic gearing. This concept means that the winding is not wound between each individual pole but instead around many poles. Typically a whole phase is encircled in a simple loop. Thereby, the winding can become several times shorter than for standard machines. At the same time, the winding can also be made several times thicker. This in turn makes the winding resistance many times smaller than for standard machines. The winding resistance can by such measures be reduced by a factor of around 1/100 to 1/5 depending on geometry and size. This also reduces the thermal problem grossly.

Another concept to consider is to increase the number of airgaps in an as small volume as possible. In other words, there is a strive to increase the total air gap area within a certain machine volume, since the force of the machine is developed in the air gap. The technology presented here implements a geometry that connects many airgaps in series magnetically, tightly packed together in a geometry that preferably creates a magnetically closed loop. This is preferably accomplished without having unnecessary long magnetic field line paths in blocks of magnetic material such as iron. The geometrical arrangements presented here accomplish this by reducing any passive return paths of magnetic material for the magnetic flux. Thereby, many times more air gap area can be packed in per unit volume in the machine presented here compared to standard electric machines. This is furthermore achieved without using excessive amount of permanent magnets.

This, in combination with the reduced resistance in the winding, also allows for a considerably higher current loading in the electric machine. This means that the shear stress, i.e. the useful force per unit area developed in the airgap, becomes 2-4 times as high as in standard machines. Even a force per unit area of up to 100 kN/m$^2$ is feasible. The gain in shear stress becomes even larger compared to standard machines when many airgaps are packed tightly together due to the magnetic gearing, since standard machines have an unfavorable scaling in this respect. This in combination with the considerable increase in airgap area per unit volume or weight gives the technology presented here a force or torque density that is many times larger than for standard machines, typically 10-25 times.

Another effect with this geometry is that it preferably can be arranged so that the normal forces on the magnetic materials at the airgap can be eliminated locally, at least ideally, which reduces the need for heavy and bulky structure material considerably. Elimination of normal forces on the magnetic material is normally also performed in prior art electrical machines, but typically in a global sense. This therefore requires an internal structure that carries the normal force from one side of the machine to the other. However, the here presented normal force elimination in a local sense is strongly advantageous. The need for robust internal structures is grossly reduced by the technology presented here.

A further benefit for some of the preferred embodiments is elimination of leakage magnetic flux. By arranging windings in a distributed way around at least three sections, the entire winding for one phase resembles a closed or nearly closed coil geometry. This geometry may be a toroidal coil or a similar shape. By having such a geometry, the leakage magnetic flux may be reduced considerably or almost be eliminated. The winding in these embodiments of the machine is to this end arranged in a way that almost eliminates the global leakage magnetic flux. Thereby, the power factor of the machine can be maintained at a reasonable level, without reducing the shear stress, and 0.8 can be reached in preferred embodiment. Also, such geometrical relations reduce problems with eddy currents in the windings and in the mechanical structure, as well as planar eddy currents in electric steel sheets.

The present invention relates preferably to a type of electrical machine that utilizes geometrical effects to grossly increase the force or torque density of the machine and increase its efficiency, especially at low speed, and in preferred cases without compromising with the power factor. The technology presented here has unprecedented performance in low speed applications such as direct drive and in applications where high force or torque densities are required, but is not limited thereto. Suitable applications are wind power, tidal power and ocean wave power, i.e. renewable energy conversion systems, electric ship propulsion, replacement of gear motors, direct drive applications and force dense actuators, but the invention is not limited thereto and can be used in many other applications as well. The invention can be implemented as a linear or rotating electric machine, but is not limited thereto.

Some terms used in the present disclosure may need a clear definition.

"Electric machines" is to be interpreted as machines that can exert a force on a movable body when an electric current is applied, or vice versa. Typically, the electric machine is used as a generator, a motor or an actuator.

The "airgap" or "air gap" is typically filled with air, but is not restricted thereto and can comprise any material that is non-magnetic such as gases, liquids, plain bearing material such as Teflon etc.

"Non-magnetic" is here to be interpreted as a material that has a relative permeability of <50 at a magnetic flux density B of 0.2 Tesla and that have a remanent flux density of <0.2 Tesla. Further, "magnetic" is here to be interpreted as a material that has a relative permeability of >=50 at a magnetic flux density B of 0.2 Tesla or a remanent flux density of >=0.2 Tesla.

Mechanical power can be expressed as P=Fv, where F is the force and v is the speed.

"Speed" is here defined as the relative speed between the movable part and the second part. The speed is defined at the respective surfaces of these two parts at the airgap separating the two parts.

"Force" is here defined as the relative force exerted by the electric current between the movable part and the second part. The forces are taken at the respective surfaces of these two parts at the airgap separating the two parts and along the movement so that it becomes a shear force at the surfaces.

"Normal force" is here defined as the attractive normal force at the airgap between the movable part and the second part.

The geometry of the technology presented here is arranged to implement magnetic gearing so that the magnetic flux is unidirectional or nearly unidirectional inside a simple winding loop. This winding loop is typically a rectangular winding loop enclosing magnetic flux over at least a uniform flux distance, as discussed further below. Note that this is not the same as distributed windings in a synchronous electric machine, where the flux is not unidirectional.

Thereby, the invention belongs to the variable reluctance electric machines family, along with the types of machines that implement magnetic gearing such as Vernier machines (VM), Vernier hybrid machines (VHM), transverse flux machines (TFM) and switched reluctance machines (SRM). These machines accomplishes the low resistance, but does not reach as high force or torque densities as the invention since they do not connect many airgaps magnetically in series, and thereby do not pack in the large airgap area per unit volume as the invention does but up to several times less. Also, these machines do not avoid magnetic leakage fluxes to the same extent as the invention, and thereby has more problems with eddy currents and a lower power factor. These machines also do not cancel out the magnetic normal forces in a local sense to the same extent as the technology presented here. Thereby they require more structure material for the same amount of torque, which makes them heavier and more expensive.

The axial flux synchronous electric machine (AFM) is a well-known synchronous machine with the magnetic flux arranged in the axial direction. In a few cases, it has been suggested that axial flux machines could operate with many airgaps magnetically connected in series which can increase its torque density. The AFM does not, however, have nearly as low winding resistance that the invention has since it does not implement magnetic gearing, and cannot therefore reach both high efficiency and high torque density since it cannot produce the same shear stress in the air gap. Further, the AFM cannot pack in as much airgap area per unit volume as the invention, since the winding resistance for the AFM has an unfavorable scaling compared to the invention when the magnetic poles are made shorter. These described features give the invention considerably better performance in terms of combined efficiency and force or torque density than any electric machine that does not implement magnetic gearing, including iron-cored and air-cored synchronous electric machines with or without permanent magnets, induction machines and synchronous reluctance machines, or a combination thereof.

FIG. 1A illustrates an embodiment of an electrical machine 1 operating by switching of magnetic flux. This embodiment is a three-phase machine, where the different phases 2A, 2B and 2C are positioned after each other. Each phase operates in principle independent of each other and they are only connected mechanically to each other. The electrical machine 1 comprises a first magnetic structure 10, in this embodiment divided in eight sections 12. The electrical machine 1 further comprises a winding 30, having a number of loops 32. In this embodiment inside the loops 32, there is a second magnetic structure 20. In this embodiment, the second magnetic structure 20 is divided in eight sections 22, of which only one can be slightly observable in the figure. Mechanical structure parts are removed in order to enable the view of the first and second magnetic structures 10, 20 and the winding 30.

The first 10 and second 20 magnetic structures are arranged movable relative to each other along a predetermined motion path 4, which in the present embodiment is a linear path. The sections 12, 22 of the first and second magnetic structures 10, 20 are placed facing each other via air gaps 40, of which only one is numbered in the figure. The air gaps 40 are parallel to the predetermined motion path 4. A closed path 3 can be defined perpendicular to the motion path 4. Along such a closed path 3, the first 10 and second 20 magnetic structures thus have respective sections 12, 22 interleaved with each other via the air gaps 40. In other words, when passing along the closed path 3, a section 12 of the first magnetic structure 10 is followed by a section 22 of the second magnetic structure 20, separated by an air gap 40. Likewise, when passing along the closed path 3, a section 22 of the second magnetic structure 20 is followed by a section 12 of the first magnetic structure 10, separated by an air gap 40. There is thus a section 12 of the first magnetic structure 20 between each pairs of sections 22 of the second magnetic structure, and analogously a section 22 of the first magnetic structure 10 between each pairs of sections 12 of the second magnetic structure.

The predetermined motion path 4 concerns a relative motion between the first magnetic structure 10 and the second magnetic structure 20. Such a predetermined motion path 4 can e.g. be defined as the motion of a fixed point at the first magnetic structure 10 relative to a fixed point at the second magnetic structure 20. Of course, the opposite definition may also be used, defining the motion of a fixed point at the second magnetic structure 20 relative to a fixed point at the first magnetic structure 10. Since the motion is a relative motion, the predetermined motion path 4 does not have any defined position in space, but is in the enclosed drawings indicated in the vicinity of the moving parts. Even though the predetermined motion path 4 is not defined in absolute coordinates, the direction of the predetermined motion path 4 is well defined also in the real world.

Each section 12, 22 can thus be defined as the part of the respective magnetic structure 10, 20 that is situated between section surfaces facing two consecutive ones of the air gaps 40, along the direction of the closed path 3.

Figure 1B:
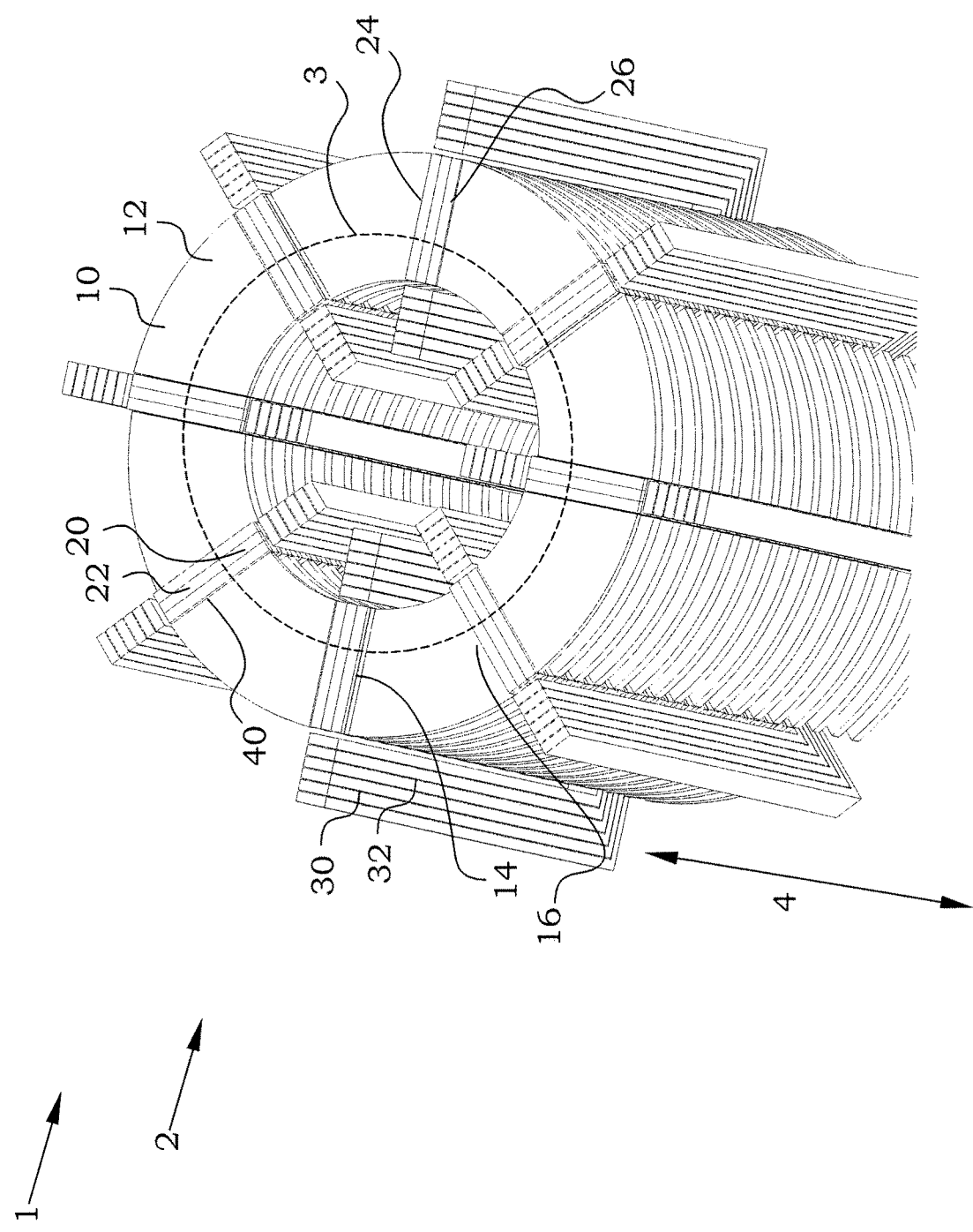
FIG. 1B is view of the embodiment of FIG. 1A with a part cut-away.

In FIG. 1B, an illustration of a cut-off phase 2 of the electrical machine 1 of FIG. 1A is shown. Here, the sections 22 of the second magnetic structure 20 are directly visible. Only one section 12, 22 and one air gap 40 is numbered in order to increase the readability of the figure. Here it can be seen that sections 22 of the second magnetic structure 20 are situated between section surfaces 24, 26 facing two consecutive ones of the air gaps 40, along the direction of the closed path 3. Also, sections 12 of the first magnetic structure 10 are situated between section surfaces 14, 16 facing two consecutive ones of the air gaps 40, along the direction of the closed path 3.

Furthermore, for each section 12, 22 of the magnetic structures 10, 20, magnetic field lines go through magnetic material between the section surfaces 14, 16, 24, 26. This means that many air gaps 40, in this embodiment 16, are connected magnetically in series. Furthermore the sections create a magnetically closed loop. The air gaps 40 are relatively tightly packed together, and there are no very long magnetic field line paths in blocks of magnetic material.

These properties can be even further enhanced by further increasing the number of interleaved sections. Presently, it is considered that there has to be more than 4 air gaps in order to achieve noticeable advantages. More pronounced advantages are achieved using more than 6 air gaps. Most preferably, more than 10 air gaps are provided and to get a truly force dense or torque dense machine more than 14 air gaps are preferably provided.

As can be seen in FIGS. 1A and 1B, there is also a varying structure of the sections 12, 22 along the predetermined motion path 4. This will be discussed more in detail in connection to FIGS. 1C-F. One should, however, notice that the first magnetic structure 10 is movable relative to the second magnetic structure 20 in the direction of the predetermined motion path 4, since the air gaps 40 are parallel thereto.

Figure 1D:
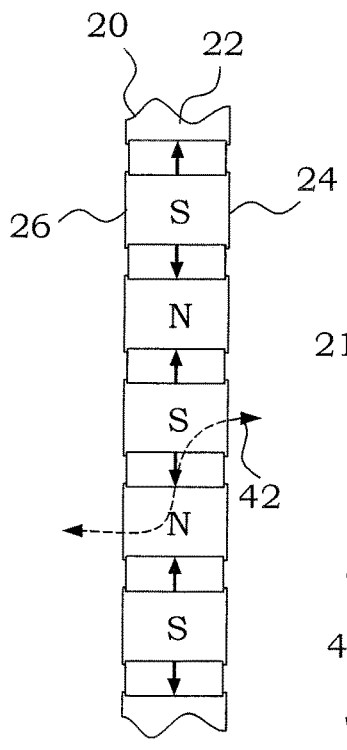
FIGS. 1C-D are schematic illustrations of an embodiment of a second magnetic structure.
Figure 1C:
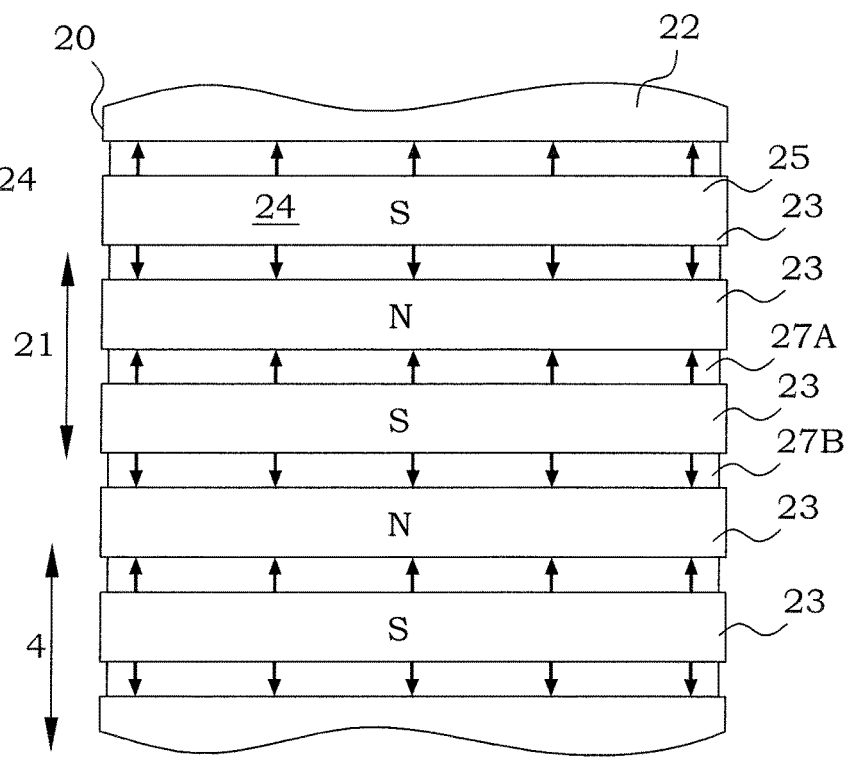

In FIG. 1C, a part of one of the section surfaces 24 is illustrated as seen from an air gap. The section 22 of the second magnetic structure 20 comprises a stack of permanent magnets 27A, 27B, interleaved with blocks of electrical steel sheets 25 or any other magnetically highly permeable material referred to as second portions of magnetically highly permeable material 23. The notation "second" is used since the portions are provided within the second magnetic structure 20. The electrical steel sheets 25 typically prohibits eddy currents in the direction of the predetermined motion path 4. The second portions of magnetically highly permeable material 23 conduct the magnetic field well, and since the permanent magnets are positioned with alternating polarity in the direction of the predetermined motion path 4, every second one of the second portions of magnetically highly permeable material 23 will present a magnetic north pole N and the others will present a magnetic south pole S. The second portions of magnetically highly permeable material 23 will act as magnetic flux concentrating structures. Thus, in this embodiment, in the direction parallel to the predetermined motion path 4 at each air gap, the second magnetic structure 20 presents permanent magnet poles N, S.

"Magnetically highly permeable material" is in the present disclosure defined as materials having a relative magnetic permeability of more than 50 at a magnetic flux density of more than 0.2 Tesla.

Another magnetically highly permeable material that can be used as blocks interleaved with the permanent magnets, or in other designs described using electrical steel sheets as discussed further below, are e.g. soft magnetic composites (SMC). These materials comprise iron particles having electrically isolating coatings, sintered into a final shape. These materials may conduct magnetic fluxes in all directions without exhibiting any eddy currents of significance.

An average distance 21 between consecutive magnetic poles of a same polarity of the second magnetic structure 20 is illustrated by a double arrow. In this particular embodiment, all distances between consecutive magnetic poles of a same polarity is the same, and is then also the same as the average thereof. However, in alternative embodiments, the permanent magnets may be provided somewhat displaced, which means that the distance between consecutive magnetic poles of a same polarity may vary somewhat, however, there is always an average.

In FIG. 1D, the same part of the section 22 as in FIG. 1C is illustrated in a radial direction. Here, the section surface 24 and 26 can be easily seen. The indicated path 42 illustrates one example of how magnetic field lines may go through magnetic material, comprising the permanent magnets 27A, 27B and the second portions of magnetically highly permeable material 23, between the section surfaces 24, 26. The section surfaces 24 and 26 are in other words magnetically connected to each other.

Thus, in one embodiment, at least one of the sections 22 of the second magnetic structure 20 comprises permanent magnets 27A, 27B, arranged to present alternating poles along the surfaces 24, 26 facing the air gaps.

In a further embodiment, each section 22 of the second magnetic structure 20 that comprises permanent magnets 27A, 27B comprises stacks, in the direction of the predetermined motion path 4. The stacks comprises permanent magnets 27A, 27B with alternating magnetization directions parallel to the predetermined motion path 4, separated by second portions of magnetically highly permeable material 23, i.e. here the blocks of electrical steel sheets 25. Thereby, the second periodicity, i.e. average distance 21, equals the distance between every second permanent magnet.

Figure 1F:
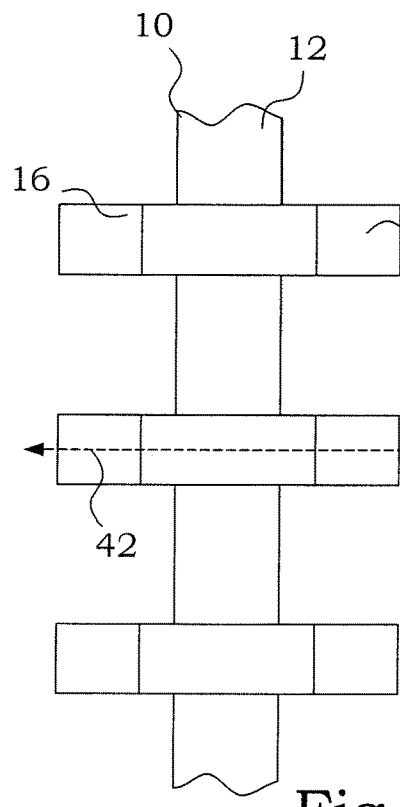
FIGS. 1E-F are schematic illustrations of an embodiment of a first magnetic structure.
Figure 1E:
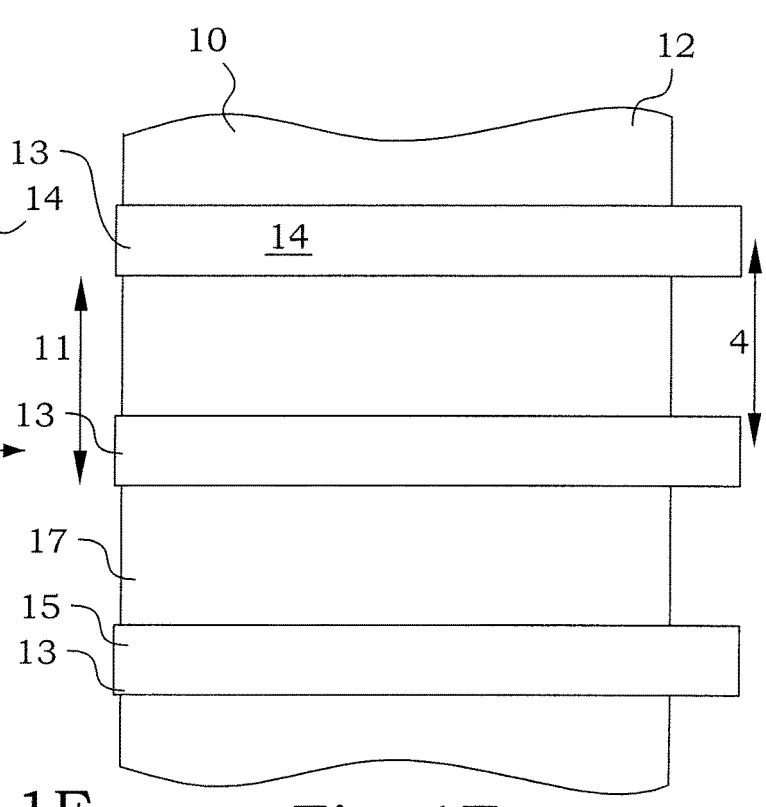

In FIG. 1E, a part of one of the section surfaces 14 is illustrated as seen from an air gap. The section 12 of the first magnetic structure 10 comprises a stack of blocks of electrical steel sheets 15, or other magnetically highly permeable material, interleaved with distance blocks 17. The blocks of electrical steel sheets 15 conduct the magnetic field well, thus presenting a high magnetic permeability at the section surface 14. However, the distance blocks 17 are either, as in this embodiment, provided at a distance from the air gap, or are made by a non-magnetic material. Therefore, the distance blocks 17 present a low magnetic permeability at the section surface 14, i.e. facing the air gap. Thus, in the direction parallel to the predetermined motion path 4 at each air gap, the first magnetic structure 10 presents a variable magnetic permeability.

In this embodiment, each section 12 of the first magnetic structure 10 comprises stacks comprising first portions of magnetically highly permeable material 13, in this case the blocks of electrical steel sheets 15. The first portions of magnetically highly permeable material 13 have a main extension perpendicular to the predetermined motion path 4. The first portions of magnetically highly permeable material 13 are separated by non-magnetic material or slits, i.e. the distance blocks 17 or the absence of material. Thereby, the first periodicity equals the distance between two consecutive first portions of magnetically highly permeable material 13.

An average distance 11 between consecutive maxima of said variable magnetic permeability of the first magnetic structure 10 is illustrated by a double arrow. In this particular embodiment, all distances between consecutive maxima of the variable magnetic permeability of the first magnetic structure 10 is the same, and is then also the same as the average thereof. However, in alternative embodiments, the first portions of magnetically highly permeable material 13 may be provided somewhat displaced, which means that the distance between maxima of said variable magnetic permeability of the first magnetic structure 10 may vary somewhat, however, there is always an average.

In FIG. 1F, the same part of the section 12 as in FIG. 1E is illustrated in a radial direction. Here, the section surface 14 and 16 can be easily seen. The indicated path 42 illustrates one example of how magnetic field lines may go through magnetic material, comprising the first portions of magnetically highly permeable material 13 between the section surfaces 14, 16. The section surfaces 14 and 16 are in other words magnetically connected to each other.

Figure 1G:
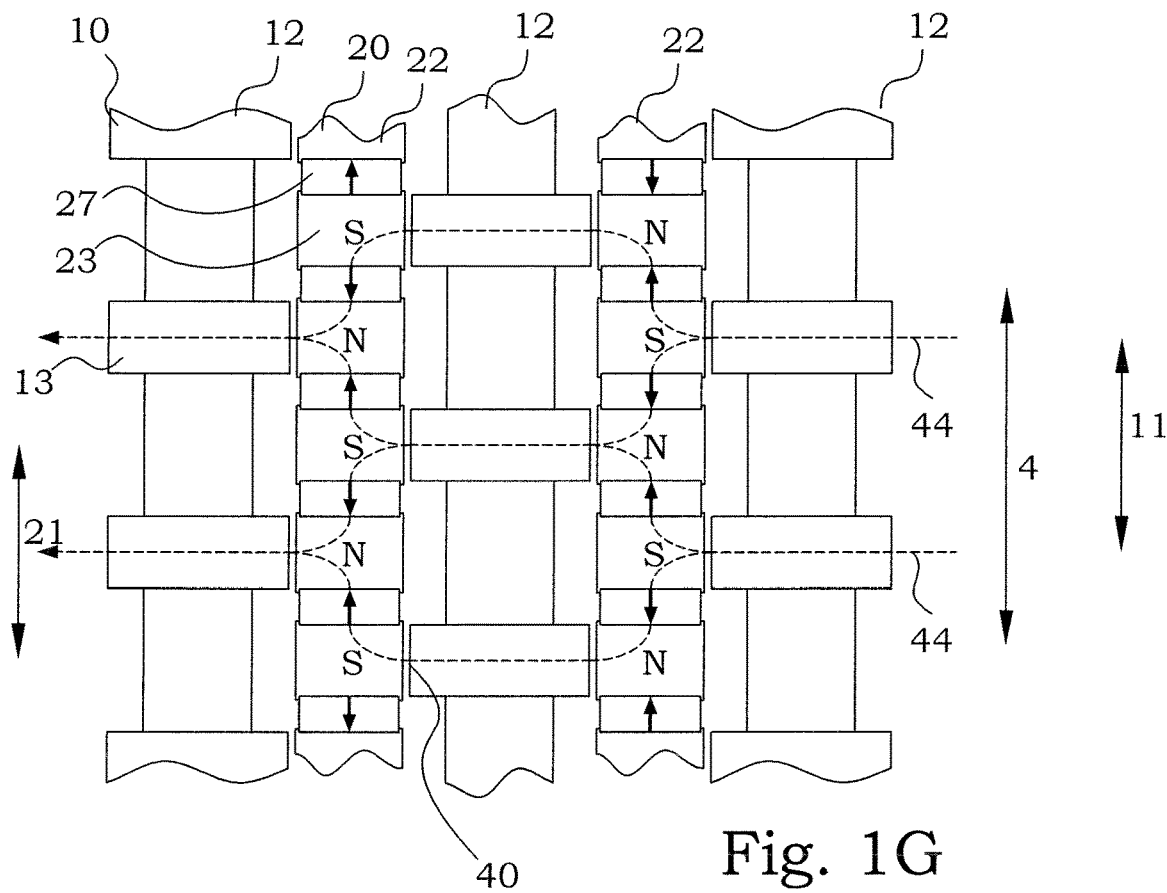
FIGS. 1G-H are schematic illustrations of embodiments of geometrical and magnetic relationships between first and second magnetic structures.

The relation between the first and second magnetic structures is also of importance. FIG. 1G illustrates schematically some sections 12, 22 of the first magnetic structure 10 and the second magnetic structure 20 along a part of a closed path perpendicular to the predetermined motion path 4. Here the alternating appearance of the sections 12 of the first magnetic structure 10 and the sections 22 of the second magnetic structure 20 are easily seen. The air gaps 40 separate the sections 12, 22 from each other. Here, it can also be seen that the magnetic parts of the section 12 of the first magnetic structure 10 are able to conduct the magnetic field from the magnetic poles of the sections 22 of the second magnetic structure 20. A magnetic flux can thus be conducted, mainly along the dotted arrows 44. It can here be noted that the illustrated magnetic flux passes each air gap 40 in a same direction, i.e. to the left in the figure.

Figure 1H:
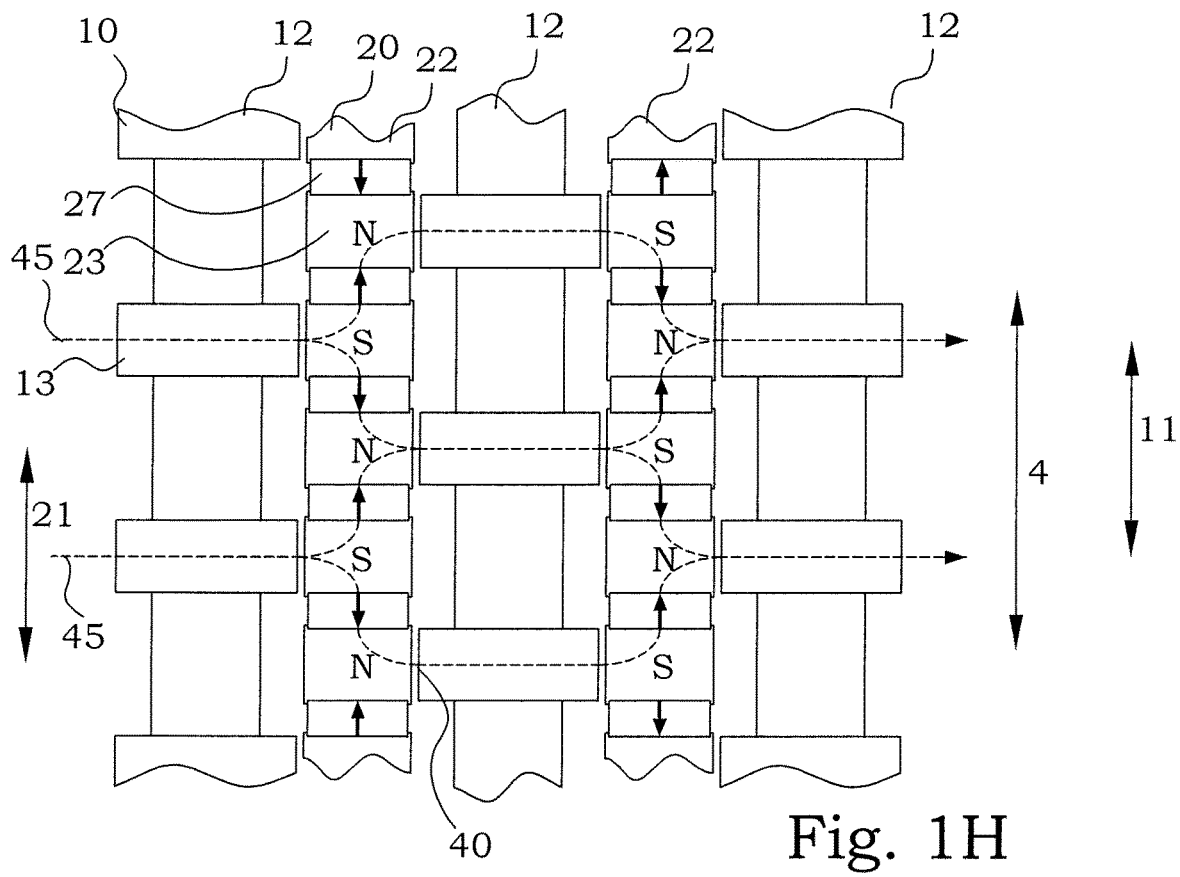

FIG. 1H illustrates schematically the sections 12, 22 of the first magnetic structure 10 and the second magnetic structure 20 of FIG. 1G when the first magnetic structure 10 and the second magnetic structure 20 have been displaced relative each other in the direction of the predetermined motion path 4 by a distance equal to half the average distance 11. The situation for the magnetic flux is now completely changed. Now, the path for the magnetic flux is in the right direction of the Figure, as illustrated by the dotted arrows 45. In each air gap 40, the magnetic flux has now changed its direction.

It can be noticed in FIGS. 1G and 1H that the effect of having a magnetic flux in the same direction over all air gaps at each instant is achieved by adapting the distance 11, of the first magnetic structure 10 to be equal to the distance 21 of the second magnetic structure 20. In order to achieve a maximum change in magnetic flux, these average distances should be the same. However, one may deviate from this demand, sacrificing a part of the shear stress and efficiency, and still have an operational machine. There are e.g. possibilities to provided minor deviations in average distances e.g. to reduce force fluctuations and so-called cogging effects, to reduce vibrations and to facilitate the start of a motor. It is also possible to use so-called skewing, where the magnetic materials in either the first magnetic structure 10 or the second magnetic structure 20 is skewed so that they present an angle relative each other in the direction of the predetermined motion path.

In FIGS. 2A-D, some embodiments of first magnetic structures 10 and second magnetic structures 20 having differing periodicities in the direction of the predetermined motion path 4 are schematically illustrated. In FIG. 2A, the periodicity of the first magnetic structure 10, represented by the average distance 11, is slightly different from the periodicity of the second magnetic structure 20, represented by the average distance 21. However, the difference is still small enough to achieve a total constructive operation. In FIG. 2B, the average periodicity is the same for both magnetic structures, however, the first magnetic structure 10 have differing individual distances 11' and 11" between consecutive structure repetitions. In FIG. 2C, it is instead the second magnetic structure 20 having differing individual distances 21' and 21". In FIG. 2D, both magnetic structures 10, 20 have differing individual distances between their respective structural repetitions, and have even a small difference in average distances 11, 21. Other configurations are of course also possible.

In embodiments having a curved predetermined motion path, magnetic structures on an outer side, with respect to the curvature, may have different average distances, 11, 21, as will be discussed further below. However, for each section of the first magnetic structure, there is always a neighbouring section of the second magnetic structure, presenting average distances falling within the limits discussed here above.

It is presently believed that such deviations in average distances should not exceed 35%. In other words, the first average distance determined as an average distance between consecutive maxima of the variable magnetic permeability of a section of the first magnetic structure is equal, within 35%, to the second average distance determined as an average distance between consecutive magnetic poles of a same polarity of a neighbouring section of the second magnetic structure. Preferably, the average distance should be kept as close to each other as possible. Therefore, in a preferred embodiment, deviations between the average distances of the first and second magnetic structures should not exceed 30%, more preferably not exceed 20% and most preferably not exceed 10%.

When defining the maxima of the variable magnetic permeability, it is the overall variations of the repetitive structure that is intended to be considered. Minor microscopic fluctuations that might give rise to small local maxima, not influencing the general energy conversion in the air gap outside are not to be considered as maxima in this respect. Likewise, other minor structures giving fluctuations of the magnetic permeability of a small extension and that does not contribute to the energy conversion in the air gap outside are to be neglected. It is believed that local maxima having a width that is smaller than 20% of the width of a widest main maxima, are of minor importance for the operation of the machine and should be neglected when defining the average distance between maxima.

Likewise, if the periodicity is disrupted by a missing main maximum, and the distance between consecutive main maxima then becomes the double distance, the operation properties will degrade somewhat, but will in most cases still be useful. Such omitted maxima in an otherwise repetitive structure should also be neglected when defining the average distance between maxima.

The presently disclosed technology is therefore based on the basic principle of a magnetic flux over an air gap that changes magnitude and direction depending on a relative position between two magnetic structures. In an ideal case, neglecting unwanted leak flux, all magnetic flux over an air gap is directed in the same direction at each moment. The machine is thus a machine that utilizes flux switching. In the present disclosure, a machine that utilizes flux switching is defined as an electrical machine operating by switching of magnetic flux and thereby implements so-called magnetic gearing.

When studying the particular embodiment of FIGS. 1A-H, it can first be seen that in this embodiment, the predetermined motion path is a linear path. It can also be concluded the machine operates due to changes in the magnetic flux along the azimuthal direction, and this type of machine can therefore preferably be denoted as an azimuthal flux switching machine.

In an ideal world, all magnetic flux passes the air gaps 40 into the opposite section, when the first portions of magnetically highly permeable material 13 of the first magnetic structure 10 are aligned with the second portions of magnetically highly permeable material 23 of the second magnetic structure 20. However, in the real world, there are always leak magnetic fluxes present. Some magnetic flux will therefore always leak back over the air gap 40 again in the opposite direction. However, by a careful design, the majority of the magnetic flux will be directed in the same direction, at least when the magnetic structures are aligned. The efficiency, shear stress and power factor of the technology presented here will in general increase if this majority is increased.

Figure 3:
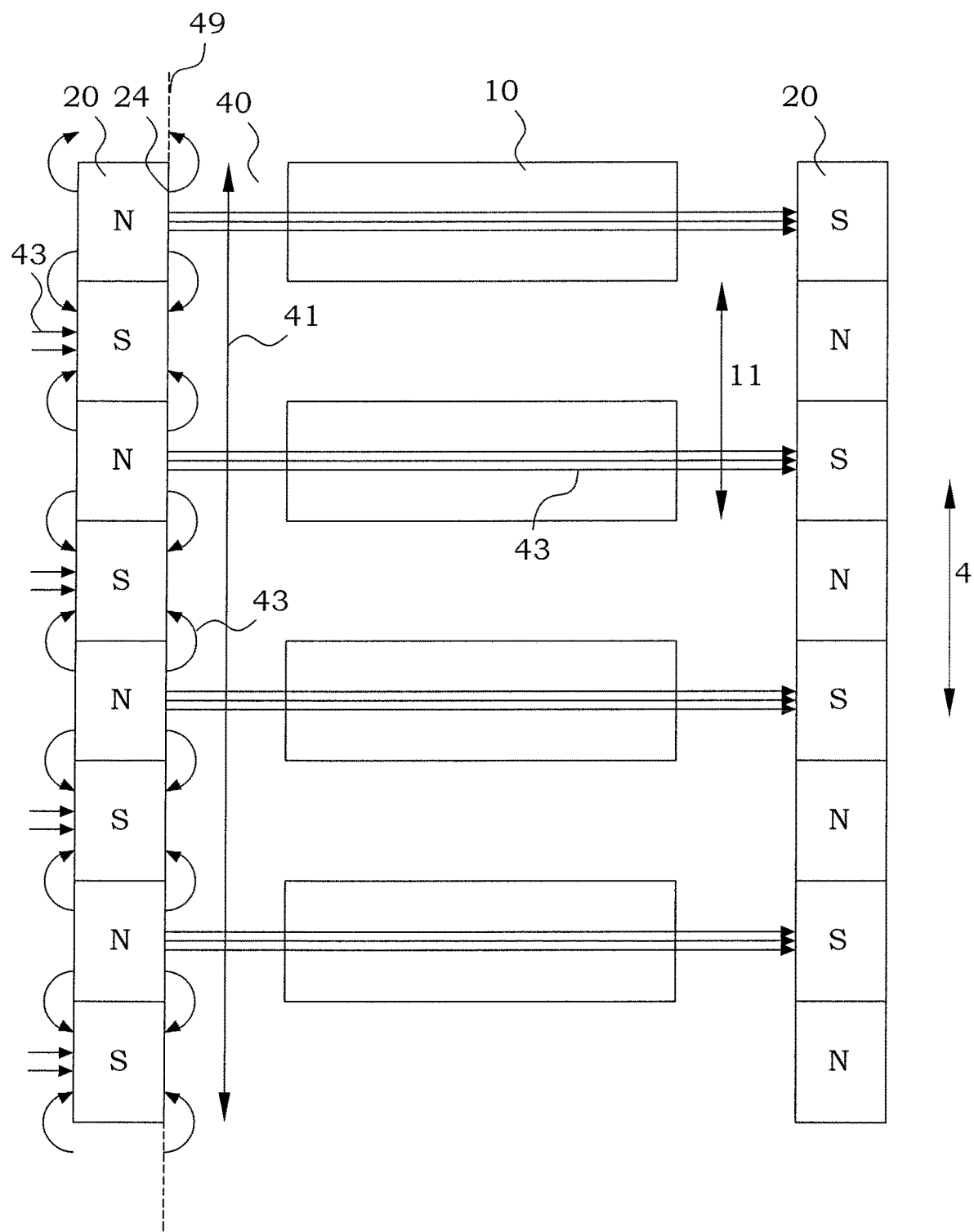
FIG. 3 is a schematic illustration of magnetic flux in airgaps.

FIG. 3 illustrates these definitions schematically. A second magnetic structure 20 presents alternating magnetic poles along a surface 24 facing an air gap 40. Magnetic flux passing from the north poles to the south poles is illustrated by arrows 43. Some, preferably most of the, magnetic flux passes via a first magnetic structure 10 to a next second magnetic structure 20. This is the magnetic flux that is utilized in the here presented technology for achieving the operation of the machine, i.e. the useful magnetic flux. Note that the air gap 40 in this illustration is dramatically exaggerated in order to increase the readability of the figure. However, some magnetic flux leaks back to the same second magnetic structure 20 without passing any first magnetic structure 10. If the situation at or close to the surface 24 is considered, indicated by the dashed line 49, magnetic flux passes outwards, i.e. to the right in the figure. In the present situation, five arrows 43 leave each north pole of the second magnetic structure 20, crossing the line 49. At the same time, magnetic flux also passes inwards, i.e. to the left in the figure. In the present situation, two arrows 43 reaches each south pole of the second magnetic structure 20, crossing the line 49.

As a minimum limit in order to achieve noticeable advantages has been estimated to be when the magnetic flux in one direction exceeds the magnetic flux in the opposite direction by about one third. In order to quantify this in a proper way, two integrated measures can be defined. In a first measure, a component, normal to the surface 24, of all magnetic flux entering or leaving the surface 24 is averaged, including its direction. In FIG. 3, since two arrows from each north pole returns to a neighboring south pole, they will cancel each other in such an averaging. Only the flux corresponding to the three arrows passing through the first magnetic structure 10 will give a contribution to the average, i.e. the "useful" or net magnetic flux for a flux switching machine. In a second measure, the magnetic flux entering or leaving the surface 24 is again averaged, but now neglecting the direction. In other words, the absolute value of the component of the magnetic flux density normal to the section surface is used for the averaging. This gives a measure of the total magnetic flux that passes the airgap in either direction. By considering a ratio between the first measure, i.e. the useful magnetic flux, and the second measure, i.e. the total magnetic flux, the relative amount of "useful" magnetic flux can be determined. As mentioned above, magnetic flux in one direction exceeding the magnetic flux in the opposite direction by about one third seems to be the lower limit for experiencing advantages. Using the ratio of the two integrated measures described above, this corresponds to about 0.15. More pronounced advantages are achieved having a ratio of at least 0.20. Even more preferred is to have a ratio of at least 0.25, and even more so is to have a ratio of at least 0.30. Most preferably, the ratio is at least 0.40.

Since the basic idea in a flux switching machine is to have a magnetic flux over an airgap that changes with the relative position between a first and a second magnetic structure, this averaging should be valid for a considerable part of the length of the air gap 40. This should also be the case for a number of consecutive magnetic poles and maxima of the variable magnetic permeability. In other words, this condition should be present in consecutive passes of the air gap along the predetermined motion path 4. It can also be expressed as if the common directed "useful" magnetic flux should be provided for at least a couple of pole periods along the air gap 40. There are different examples of non-flux-switching machines that locally may have uniformly directed magnetic flux over an air gap, but not over a distance including several magnetic pole periods. The averaging should also be taken over a full number of pole pairs. The above mentioned averaging should therefore be taken over a distance in the predetermined motion path 4 direction of more than three pole pairs. In FIG. 3, the arrow 41 indicates an averaging distance of four times the average of the pole pair distance. It is thus presently believed that an average over an integer, being at least three, times the average distance 11 between consecutive maxima of the variable magnetic permeability of the first magnetic structure 10 ensures a true flux-switching basic design. The distance over which the averaging is made should thus be an integer times the periodicity of the magnetic structures in order to have a meaningful ratio to discuss. Otherwise, flux differences within a period may influence the ratio, which is not intended.

It should also be noticed that the relation between useful magnetic flux and magnetic flux returning to the same magnetic structure may vary over the device. It is e.g. more likely that the useful magnetic flux is lower at the ends of the magnetic structures than in the middle of the magnetic structure, in the direction of the predetermined motion path. The provision of deviations in distances within of the magnetic structures, discussed further above, may also change the ratio of the useful magnetic flux from one position to another. The above discussed conditions are thus intended to be present at at least one position in the air gap, e.g. close to the middle of the magnetic structures and/or close to portions with repetitive distances between elements of the magnetic structures.

It should also be noticed that the relation between useful magnetic flux and magnetic flux returning to the same magnetic structure may vary over the operation phases. When the varying structures of the first and second magnetic structures are in registry to each other, e.g. as illustrated in the FIGS. 1G and 1H, the useful magnetic flux is believed to be very high. However, in intermediate relative positions, i.e. in other operation phases, the situation may be different. The above discussions about the flux ratio is therefore intended to be valid at least for one operation phase, e.g. when the useful magnetic flux is maximized.

In other words, for each of the air gaps 40, at at least one position at at least one operation phase, an average of a component of the magnetic flux density normal to the section surface at an airgap 40 is larger than 15% of an average of an absolute value of the component of the magnetic flux density normal to the section surface, wherein the averages are to be taken over a uniform-flux distance, wherein the uniform-flux distance is an integer, larger than 3, times the first average distance 11 along the respective air gap 40 in the direction of the predetermined motion path 4. For achieving a high performance, it is preferred that these conditions are present in an as large portion of the machine as possible. Therefore, in preferred embodiments, this relation holds also for uniform-flux distances of more than 5 times, even more preferably more than 9 times and most preferably more than 15 times, the first average distance 11 along the respective air gap 40 in the direction of the predetermined motion path 4.

As mentioned briefly above, the normal forces on the magnetic materials at the airgap can be eliminated locally. The force on the second magnetic structure 20 from the first magnetic structure 10 from one side is ideally compensated by an equal force from the first magnetic structure 10 on the opposite side. Similarly, the force on the first magnetic structure 10 from the second magnetic structure 20 from one side is compensated by an equal force from the second magnetic structure 20 on the opposite side, except for a (dependent on geometry) small force component perpendicular to said closed path 3 which is easily handled mechanically. The forces thus balances, which reduces the need for heavy and bulky structure material considerably. In the real world, deviations from the perfect geometry will always be present, and those deviations will generate normal forces that do not cancel according to Earnshaw's theorem. These forces are, however, of much smaller magnitude and are typically handled by bearings. The here presented normal force elimination in a local sense, has not earlier been used in this way.

Figure 4:
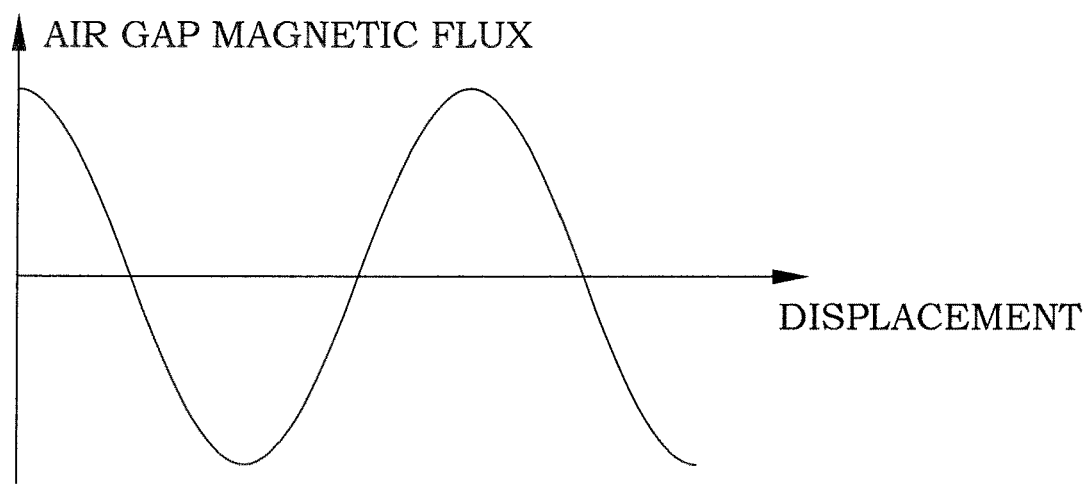
FIG. 4 is a diagram illustrating an example of a varying air gap magnetic flux.

The magnetic flux across an airgap will thus vary upon changing the relative displacement of the first magnetic structure 10 and the second magnetic structure 20 along the predetermined motion path 4. This is schematically illustrated in FIG. 4. This change in magnetic flux appears simultaneously in all air gaps and in all sections of both the first magnetic structure 10 and the second magnetic structure 20. By arranging the windings 30 to encircle this variable magnetic flux, the operation of an electrical machine can be achieved.

Figure 5:
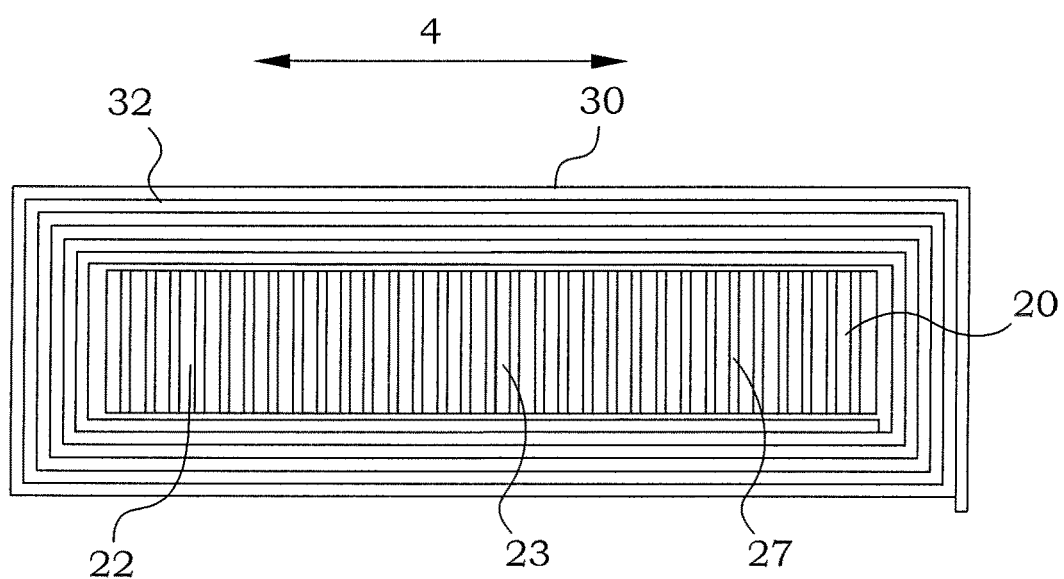
FIG. 5 is a schematic illustration of a cross-section of an embodiment of a second magnetic structure and associated winding loops.

FIG. 5 illustrates an embodiment of a winding 30, having loops 32, i.e. a number of turns, provided around a section 22 of the second magnetic structure 20 so that the winding makes one or more turns around the section 22. The changing magnetic flux of FIG. 4 will also be present over the section 22 of the second magnetic structure 20. The loops 32 are generally extended parallel to the predetermined motion path 4, i.e. transverse to the closed path, which in this embodiment is directed perpendicular to the plane of the paper in the Figure. In other words, the loops 32 have their main extension in the direction of the predetermined motion path 4. In order to benefit from the substantially uniform direction of the magnetic flux to reduce the winding resistance in relation to the amount of power that is converted, it is beneficial to let the loops encircle a plurality of magnetic pole distances, i.e. the distance between consecutive magnetic poles of a same polarity, along the predetermined motion path 4. In order to achieve a noticeable advantage, it is presently believed that at least three magnetic pole distances should be encircled by at least one single loop 32. However, the more of the section 22 of the second magnetic structure 20 that is encircled by a single loop, the less winding material in total is required and the lower the resistive losses can be in relation to the power converted. In the FIG. 5, 15 magnetic pole pairs are encircled.

In one embodiment, the winding is wound non-perpendicular to the predetermined motion path around more than two sections of the first magnetic structure or more than two sections of the second magnetic structure.

In a further embodiment, the loops of the winding are wound parallel to the predetermined motion path encircling a plurality of consecutive ones of the first portions of magnetically permeable material.

The concept of magnetic gearing is used by that the winding is not wound between each individual pole but instead around many poles. This gets around the problem that the winding becomes longer and thinner when the poles are made shorter, which limits the low speed performance of standard machines. Typically a whole phase is encircled in a simple loop, which means that the winding can be kept very short. Typically, the loop has a rectangular or similar shape. Also, the winding can be made several times thicker since there is plenty of space available and since it does not cost so much for a short winding. Altogether, this makes the winding resistance many times smaller than for standard machines.

As will be discussed further below, the winding 30 may also be provided around the first magnetic section as well. In other words the winding has a loop provided around the respective section for at least the above mentioned uniform-flux distance in the direction of the predetermined motion path.

Furthermore, in order to prevent the flux from leaking out of the structure, it is of benefit to provide loops around several of the sections. This will be discussed more in detail below. It is believed that an effect can be achieved by having loops around at least three of the sections of the magnetic structures. The more sections that are encircled by loops, the more power per unit weight can be utilized and the lower the magnetic leakage flux will be. Preferably, loops are provided around at least four, more preferably at least six and most preferably at least eight of the sections of the magnetic structures. In the embodiment of FIG. 1A, there are loops around all eight sections.

If the electrical machine is operated as a generator, the first magnetic structure 10 and the second magnetic structure 20 are forced to move relative each other, inducing a voltage in the loops 32 of the windings 30. Likewise, if the electrical machine is operated as a motor, a varying current through the loops 32 of the windings 30 will result in a force between the first magnetic structure 10 and the second magnetic structure 20, creating a relative motion.

Thus, in one embodiment, the electrical machine is a generator. A relative motion of the first and second magnetic structures gives rise to an induced alternating voltage in the winding.

In another embodiment, the electrical machine is a motor. An alternating current conducted through the winding causes a relative motion of the first and second magnetic structures.

So far, only the relative motion between the first magnetic structure and the second magnetic structure has been discussed. This can be obtained in many different ways.

In one embodiment, the first magnetic structure is a stator. In other words, the first magnetic structure is mechanically attached to stationary supporting parts of the machine. The second magnetic structure is then arranged movable relative to the stator, i.e. also relative to the supporting parts of the machine. In the case of a linear predetermined motion path, the second magnetic structure thus becomes a translator.

In another embodiment, the situation is the opposite. The second magnetic structure is a stator. In other words, the second magnetic structure is mechanically attached to stationary supporting parts of the machine. The first magnetic structure is then arranged movable relative to the stator, i.e. also relative to the supporting parts of the machine. In the case of a linear predetermined motion path, the first magnetic structure thus becomes a translator.

In yet another embodiment, both the first and second magnetic structures may be movable relative to stationary supporting parts of the machine.

The geometries that are presented here connect many air gaps in series magnetically. This creates typically a geometrically closed loop of sections, even if this closed loop is not an absolute requirement. If magnetic gearing is to be implemented, there is a large unidirectional magnetic flux passing though the airgap. Since the magnetic flux density is divergence free, the magnetic flux cannot vanish but must more or less continue into a closed loop. Thereby, if the sections themselves do not form a loop, other blocks of magnetic material must be added to provide this function. Since the flux is large, the magnetic field line paths in these blocks of magnetic material will become long. It is preferred to avoid unnecessary long magnetic field line paths in blocks of magnetic material such as iron, between the air gaps, since these blocks do not provide force or power but only extra mass, extra losses and extra costs. One result of these ideas is that loops of the winding can be placed around sections of the first and/or second magnetic structure where the magnetic field lines are not given an opposite direction. In other words, the magnetic field lines may typically not change their direction very much between loops around consecutive sections. In the embodiment of FIGS. 1A-H, the eight sections encircled by loops enclose magnetic field lines that are directed 45° with respect to their neighbouring loops. These ideas increase the possibilities to achieve a high number of air gaps as well as facilitate reduction of leak magnetic fields.

Thus, in one embodiment, magnetic field lines passing two consecutive respective loops change their direction less than 150 degrees between the positions of the two consecutive loops, and preferably not more than 120 degrees, and most preferably, not more than 90 degrees.

Figure 6:
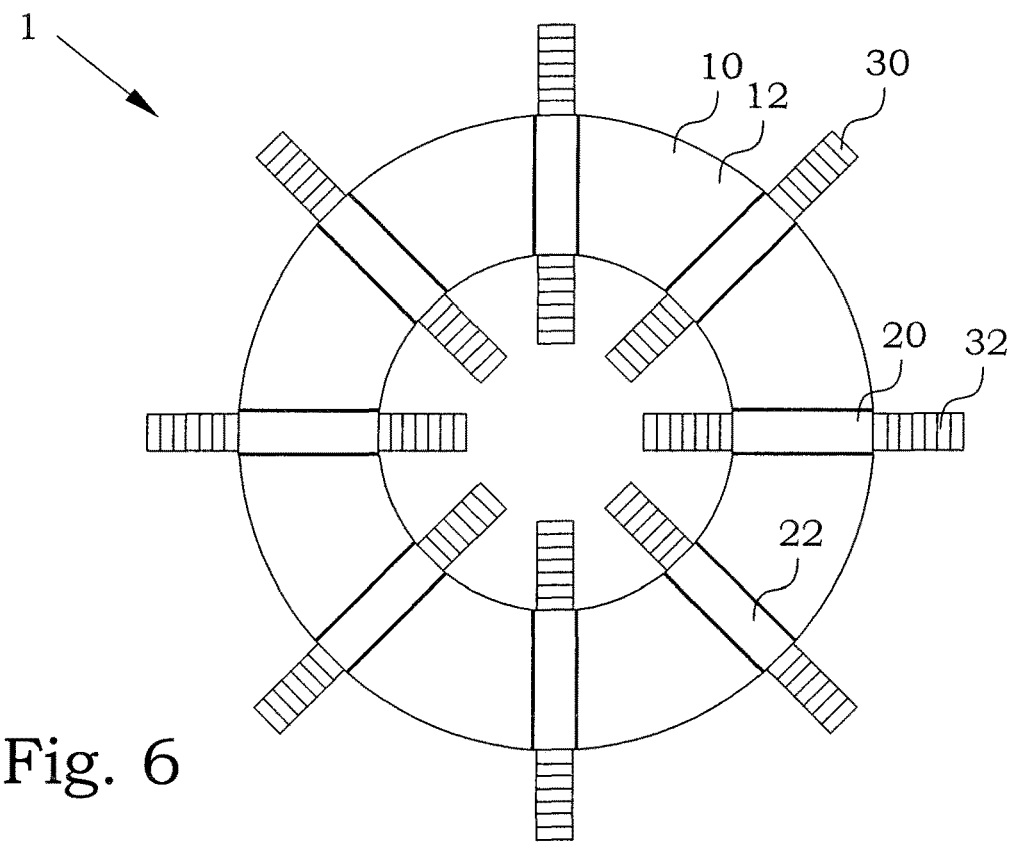
FIG. 6 is a cross-sectional view of an embodiment of an azimuthal or a poloidal flux machine.

FIG. 6 illustrates a cross-section perpendicular to the predetermined motion path of the flux switching electrical machine 1 of FIG. 1. In this embodiment, it is implemented with a circular layout and a flux concentrating magnet structure. As can be seen, the winding 30 resembles by its loops 32 a sparse toroidal coil. An ideal toroidal coil does not have leakage fluxes at all. In this embodiment, the sparse toroidal coil winding inherits some of those properties and thereby the global leakage flux becomes very small. An increased number of loops around the toroidal shape will decrease the leakage flux and at the same time decrease the distances between consecutive air gaps.

The winding in the machine is thus arranged in a way that almost eliminates the global leakage magnetic flux. The power factor of the machine can by this be maintained at a reasonable level, without reducing the shear stress. A power factor of 0.8 can be reached in preferred embodiments. Also, such geometrical relations reduce problems with eddy currents in the windings and in the mechanical structure, as well as planar eddy currents in electric steel sheets.

The present technology thus utilizes geometrical effects to increase the force or torque density of the machine and increase its efficiency. This becomes particularly noticeable at low speed. In preferred embodiment, this can be achieved even without compromising the power factor. The technology presented here has therefore unprecedented performance in low speed applications such as direct drive and in applications where high force or torque densities are required. However, the technology is not limited thereto. Suitable applications are renewable energy conversion systems in general, e.g. wind power or ocean wave power, electric ship propulsion, replacement of gear motors, direct drive applications and force dense actuators. However, the technology is not limited thereto and can be used in many other applications as well.

However, the design with circular cross section puts some demands on the mechanical structure and its mounting, especially for rotating machines where a curvature is introduced in the predetermined motion path 4 which breaks the cylindrical symmetry. For achieving designs that are attractive for manufacturing and mounting, some sacrifices in magnetic properties may be of interest for achieving designs that are easier to build.

Figure 7:
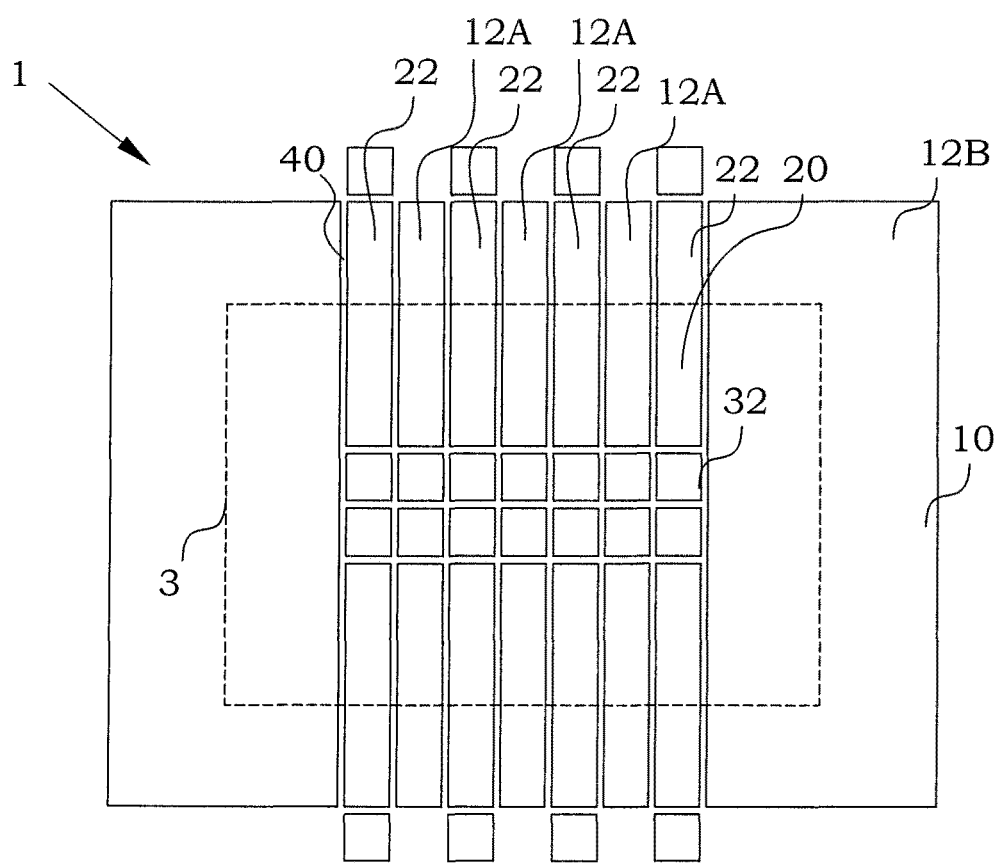
FIG. 7 is a cross-sectional view of another embodiment of an azimuthal or a poloidal flux machine.

One alternative is illustrated in FIG. 7. This design is based on straight building blocks, where sections 22 of the second magnetic structure 20 are interleaved with sections 12A of the first magnetic structure 10. Two end sections 12B of the first magnetic structure 10 then connects the assembly into a magnetically closed loop, presenting a closed path 3. In this structure, sections 12A of the first magnetic structure 10 are enclosed by loops 32 of the winding.

This embodiment is far easier to produce and mount, but has some disadvantages in the magnetic behavior. First, even if the loops of the aligned sections in the upper or lower part of the figure enclose field lines that have the same direction, the loops on either side of the end sections 12B instead enclose field lines having changed their direction by 180 degrees, which is not optimal. This will inevitably cause some leak fields. The disadvantage of these non-optimum magnetic properties has to be put in relation to the benefit of having only straight blocks to mount.

Figure 8:
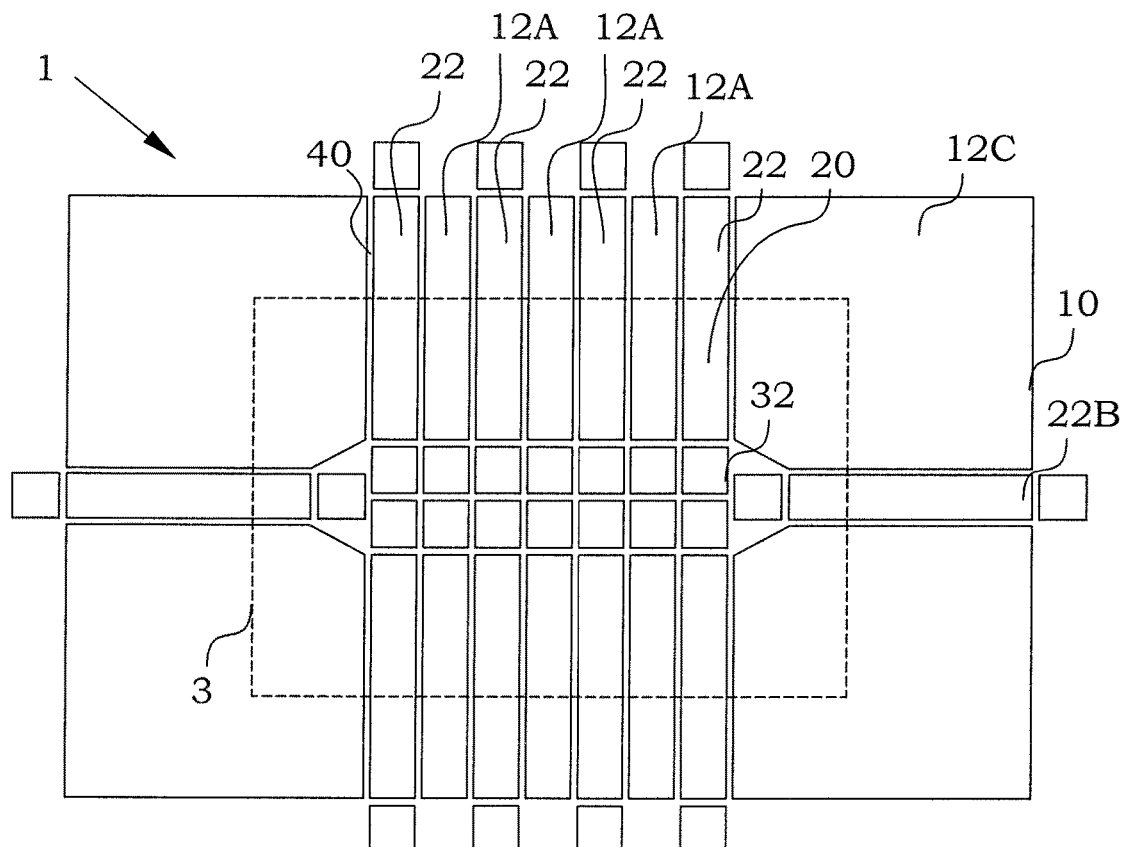
FIG. 8 is a cross-sectional view of yet another embodiment of an azimuthal or a poloidal flux machine.

FIG. 8 is an alternative embodiment. Here two additional sections 22B of the second magnetic structure 20 have been added to the sides of the structure. These sections 22B are interleaved between two corner sections 12C of the first magnetic structure 10. The magnetic field lines do in this embodiment not change their direction by more than 90 degrees anywhere in the structure, which improves the magnetic behaviour. However, the additional sections 22B instead add to the complexity of the mounting and construction.

In the embodiments above, a stack of permanent magnets 27A, 27B, interleaved with second portions of magnetically highly permeable material 23, acting as magnetic flux concentrating structures, have been illustrated. In other words, each section of the second magnetic structure comprises permanent magnets 27A, 27B, arranged to present alternating poles along the surfaces 24, 26 facing the air gaps 40, whereby the second periodicity equals the distance between two consecutive poles of a same polarity. Preferably, the loops of the winding are wound parallel to the predetermined motion path encircling a plurality of consecutive second sheets of magnetic material. However, the provision of a magnetic field can also be provided by other configurations.

Figure 9:
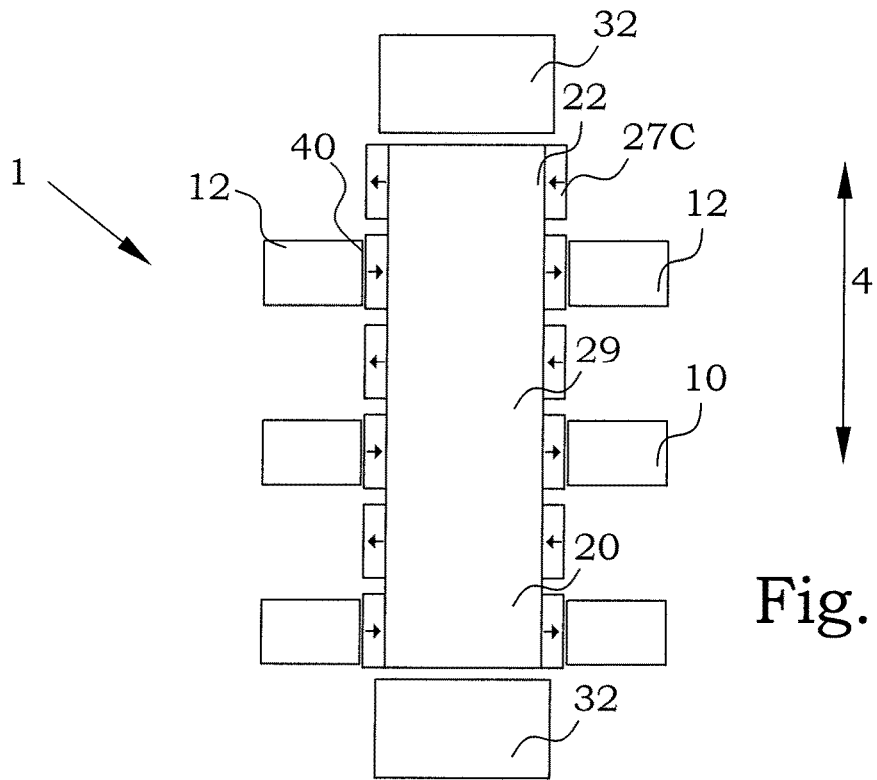
FIG. 9 is a schematic illustration of an embodiment of a geometrical relationship between first and second magnetic structures utilizing surface mounted permanent magnets.

FIG. 9 illustrates schematically a cross sectional view of a linear transverse flux machine with surface mounted magnets. This presents an alternative way to provide permanent magnet poles along the air gap 40 in the direction parallel to the predetermined motion path 4 of the second magnetic structure 20. The second magnetic structure 20 here comprises sections 22 that have a central body 29 of magnetic material. At the surface of the central body 29 surface mounted magnets 27C are provided. With such a design, the polarity on opposite sides of the section 22 can be different, which means that the sections 12 of the first magnetic structure 10 can be mounted without displacements in the direction of the predetermined motion path 4. However, since there is a magnetic force on the surface mounted magnets 27C perpendicular to the predetermined motion path 4, there have to be means for securing a safe mounting of the surface mounted magnets 27C.

In an alternative embodiment, the second magnetic structure presents magnetic poles comprising superconducting material in the direction parallel to said predetermined motion path at each air gap. These poles are then provided by a winding formed of a superconducting material, which have loops. This embodiment has the advantage that considerably higher magnetic flux densities can be accomplished without the use of iron in the second magnetic structure. The drawbacks are that the solution is more expensive and that it requires a cryostat system to cool the superconducting windings to superconducting temperatures.

Figure 10:
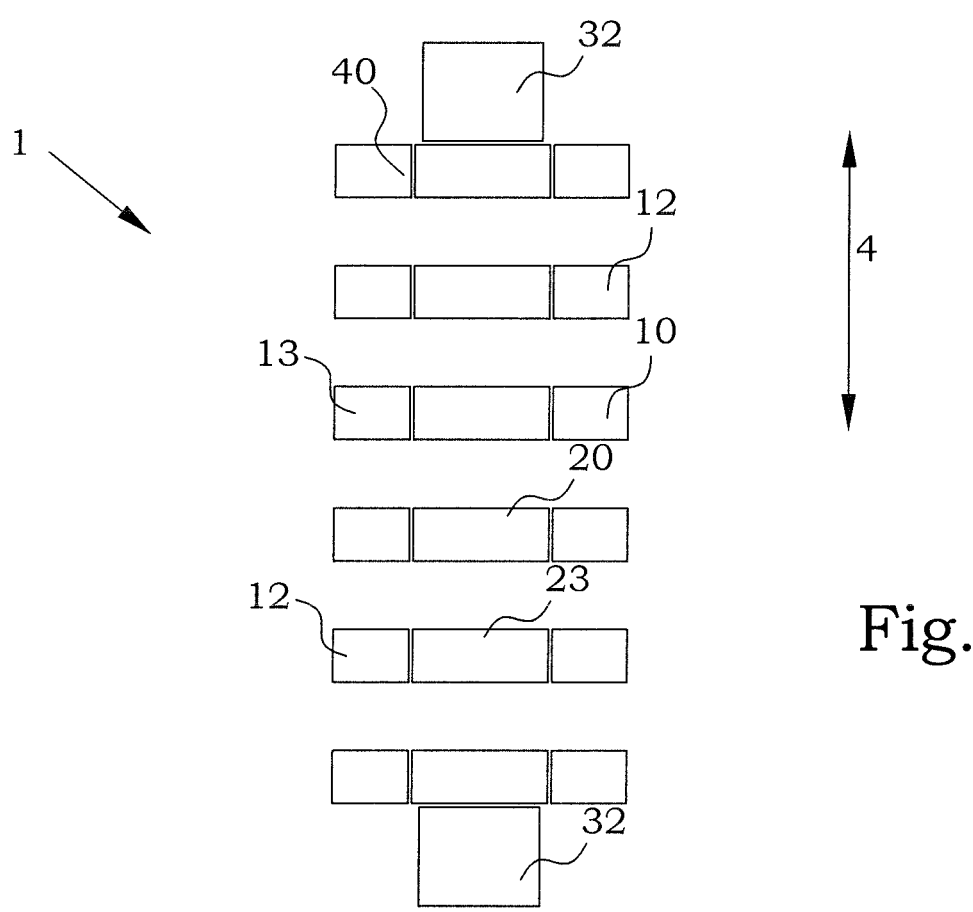
FIG. 10 is a schematic illustration of an embodiment of a geometrical relationship between first and second magnetic structures in a switched reluctance machine.

In yet another alternative, a switched reluctance machine design can be adopted. FIG. 10 illustrates the relation between the first magnetic structure 10 and the second magnetic structure 20 in such an approach. The second magnetic structure 20 here comprises second portions of magnetically highly permeable material 23, e.g. blocks of electrical steel sheets 25. They are provided with essentially the same periodicity as the first portions of magnetically highly permeable material 13 of the first magnetic structure 10. Also here, deviations from the exact matching between the periodicities, as was discussed further above, can be applied. The second magnetic structure 20 thus presents a variable magnetic permeability in the direction parallel to the predetermined motion path at each air gap.

The force in the switched reluctance embodiment is produced by simple attraction between the magnetic material in the first magnetic structure 10 and the magnetic material of the second magnetic structure 20 when they are unaligned and magnetized by a current in the winding. This force can be in either direction dependent on the relative position between the first magnetic structure 10 and the second magnetic structure 20. Thereby, one phase of the switched reluctance embodiment can only produce force in the desired direction for half of the electric period, two quadrants out of four, and remain passive during the other two quadrants. This is a drawback for the machine type, which directly halves the average force density and doubles the required number of phases. Also, the force is generally lower than for the permanent magnet embodiments, which is a further disadvantage, and the power factor and the efficiency is lower. The advantage of the switched reluctance embodiment is, however, that there are no expensive permanent magnets in the embodiment which lowers the material cost and does not create a dependency on the availability of permanent magnet materials such as neodymium and dysprosium for manufacturing of such units. Further, there are no attraction forces between the first magnetic structure 10 and the second magnetic structure 20 when there is no current in the winding. Thereby, the manufacturing and assembly becomes considerably less complicated.

Thus in one embodiment, at least one of the sections of the second magnetic structure comprises stacks of second portions of magnetically permeable material, preferably having a main extension perpendicular to the predetermined motion path, separated by non-magnetic material or slits, whereby the second average distance is determined as an average distance between consecutive second portions of magnetically permeable material.

In a further embodiment, loops of the winding are wound parallel to the predetermined motion path encircling a plurality of consecutive ones of the second portions of magnetically permeable material.

It could be noted that in some embodiments, the switched reluctance approach can be combined with magnetized magnetic structures. To this end, some sections of the second magnetic structure can be of a reluctance switched type, as described here above, while other sections of the second magnetic structure may have a structure based on magnets, e.g. according to any of the embodiments described in connection with FIGS. 1A-9.

So far, only linear predetermined motion paths have been discussed. However, it is also possible to utilize the above ideas for curved predetermined motion paths, e.g. rotating machines.

For rotating machines, most of the principles discussed above are still valid. The main difference is the shape of the predetermined motion path. The first and second magnetic structures have to be shaped in the same main shape as the predetermined motion path. This means that is if the predetermined motion path is a circular path, the magnetic structures also have to be circular or formed as circle segments.

Figure 11:
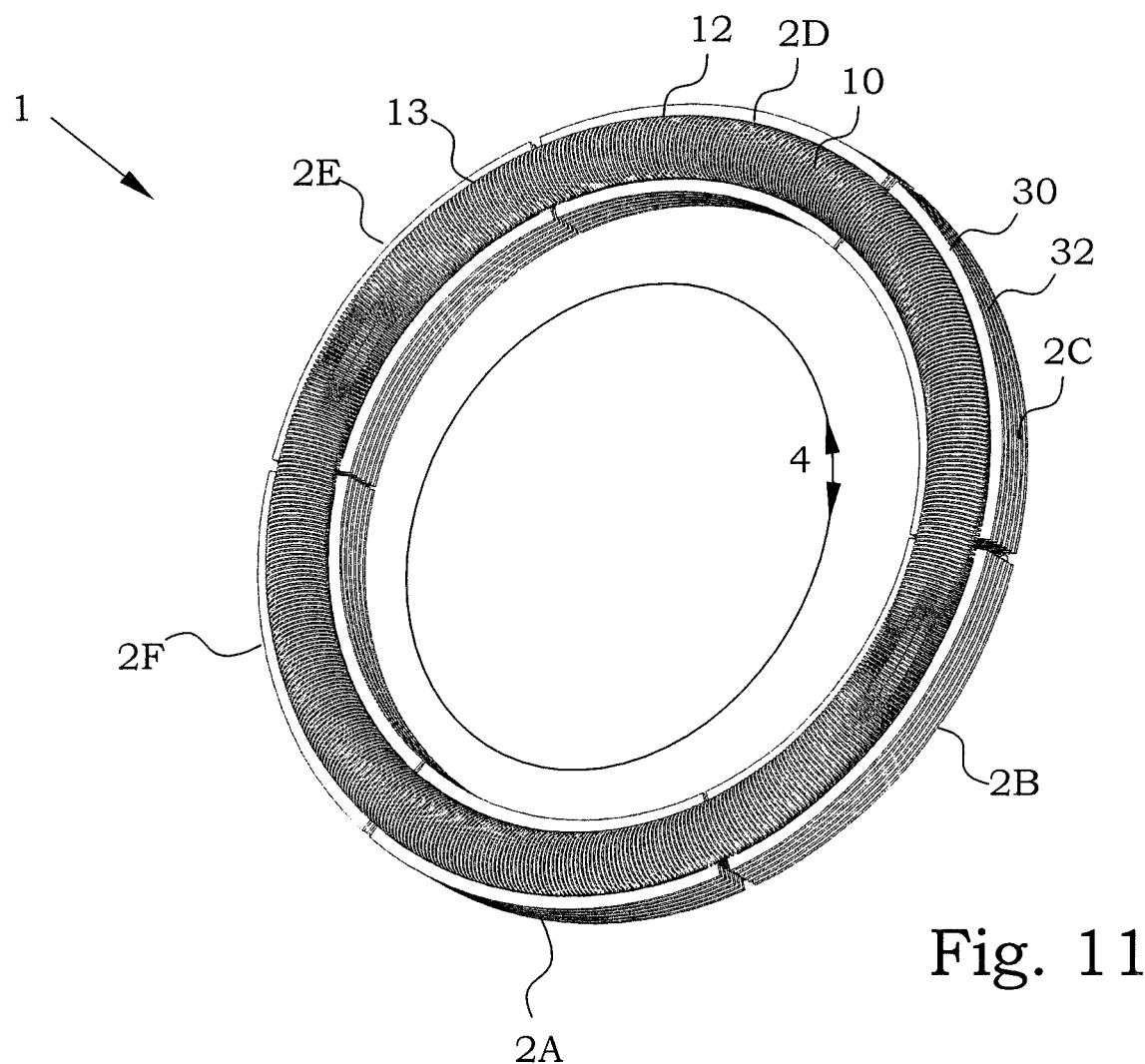
FIG. 11 is a schematic illustration of parts of an embodiment of a poloidal flux machine.

FIG. 11 illustrates one embodiment of a rotating machine according to the above presented ideas. A circular predetermined motion path 4 is illustrated. A first magnetic structure 10, having a main toroidal shape, presents a section 12 having a number of first portions of magnetically highly permeable material 13 provided in the direction of the predetermined motion path 4. The rotating electrical machine 1 has in this embodiment six phases 2A-F, and depending on the detailed displacements between the first magnetic structure 10 of the different phases, the machine can be a one, two, three or six phase machine. A number of loops 32 of a winding are seen at the outside and inside of the main toroidal shape. The second magnetic structure is not seen in this view.

As briefly mentioned above, the sections 12, 22 at the inner side of the curvature, i.e. facing the center of the rotating machine, have a slightly smaller average distance between the repetition of the magnetic behaviour of the magnetic structures 10, 20 along the predetermined motion path than sections at the outer side. However, typically, neighbouring sections still fall within the above discussed 20% discrepancy range.

Figure 12:
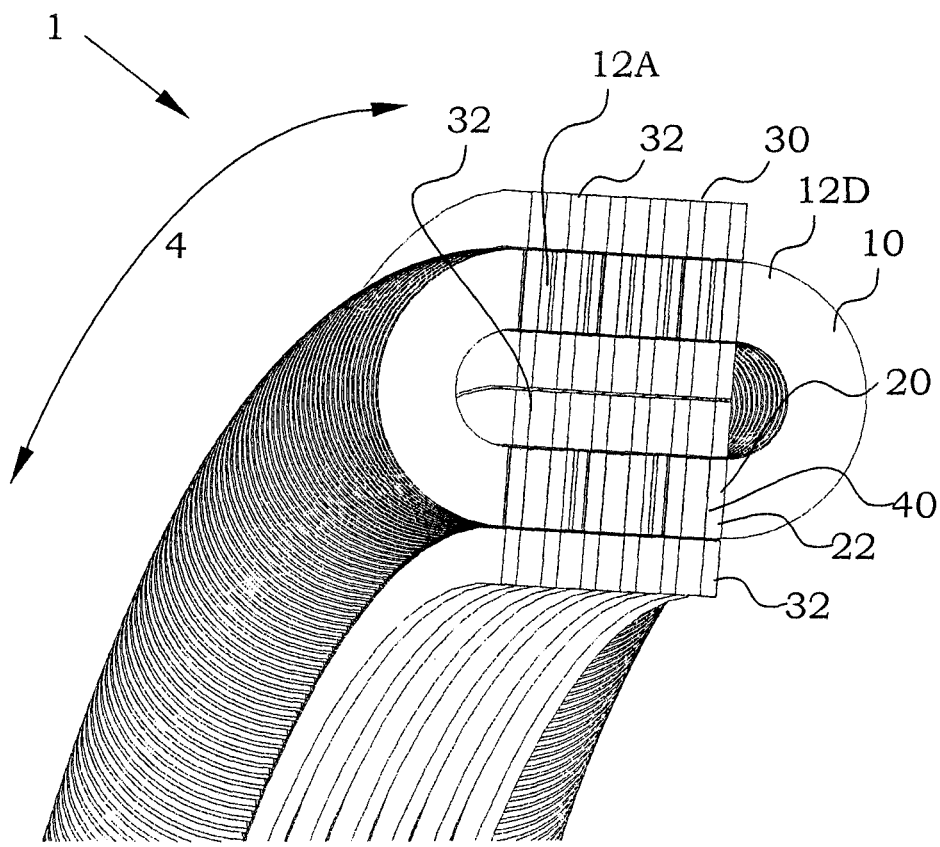
FIG. 12 is a schematic illustration of parts of an embodiment of first and second magnetic structures and windings of a poloidal flux machine with parts cut-away.

FIG. 12 is a part of a cut-away illustration of the embodiment of FIG. 11. Here, it can be seen that there is a "race-track shaped" cross-section. The long sides comprise alternating sections 12A, 22 of the first magnetic structure 10 and second magnetic structure 20, respectively. At the ends of the "race-track", semicircular sections 12D of the first magnetic structure 10 close the magnetic path into a closed path. Loops 32 of the windings are provided at the outside and inside of the "race-track", i.e. inside and outside of the closed magnetic part, separated by support distance blocks. The loops 32 are extended to enclose parts of the second magnetic structure 20 belonging to a phase of the machine.

When studying the particular embodiment of FIGS. 11-12, it can first be seen that in this embodiment, the predetermined motion path is a circular path, or at least a part thereof. It can be further noticed, that in this rotary machine, the magnetic flux crossing airgaps 40 are directed in a poloidal direction. Since the machine operates due to changes in the magnetic flux along the poloidal direction, this type of machine can therefore preferably be denoted as a poloidal flux switching machine.

Thus, in one embodiment, the predetermined motion path is a circular arc path, whereby the electrical machine is a poloidal flux machine.

Figure 13:
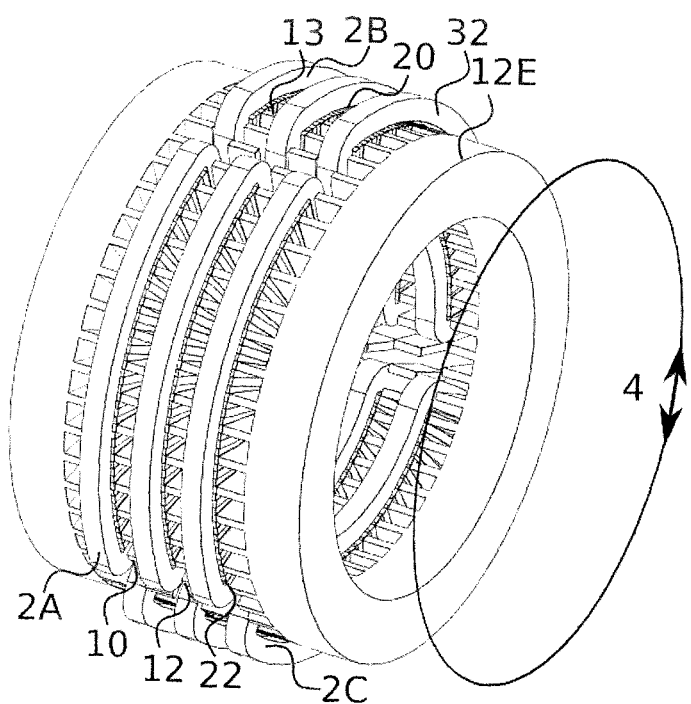
FIG. 13 is a schematic illustration of an embodiment of a rotating machine with parts cut-away.

FIG. 13 presents another embodiment of a rotating machine, where the structural material has been removed for clarity. A circular predetermined motion path 4 is illustrated. A first magnetic structure 10, having a main toroidal shape, presents a section 12 having a number of first portions of magnetically highly permeable material 13 provided in the direction of the predetermined motion path 4. An arbitrary number of phases, greater than one, is distributed along the predetermined motion path 4, in this particular illustration 3 phases 2A-C. One or more loops 32 of a winding, connected either in series or parallel or in a combination thereof for each phase, are in this embodiment provided around sections 22 of the second magnetic structure 20. Two toothed sections 12E of the first magnetic structure connects the phases magnetically and closes the magnetic circuit of the machine.

In rotary machines, the moving magnetic structure is often referred to as a rotor. Thus, in one embodiment, the second magnetic structure is a rotor. In another embodiment, the first magnetic structure is a rotor.

The geometry of this poloidal flux switching machine with racetrack cross section geometry is not as good at avoiding leakage fluxes as the azimuthal flux switching machine with circular geometry presented further above. However, as was discussed earlier, the geometry is instead less complex to manufacture.

As anyone skilled in the art realizes, any geometry used for the linear machines can be transferred also to the rotary machines. However, due to the additional curvature, manufacturing and mounting will typically be even more cumbersome for rotary machines, if an optimum magnetic behaviour is requested.

In rotary machines having only one phase, the winding may be provided in a somewhat special way. This is illustrated in FIG. 14. In this embodiment, the winding 30 is provided as one single loop encircling the entire rotary machine, interior of the magnetic path. The loop of the winding 30 is here provided along the sections along an entire closed predetermined motion path 4.

This embodiment has the advantage of a shorter winding, since no return winding is required, which then reduces the conductive losses for one particular embodiment. The drawback is that one embodiment is required for each phase, and that at the very least two or preferably three separate rings are required to produce a constant torque which is normally necessary. Thereby, each conductor ring magnetizes less material and produces less force, which makes the reduction of resistive losses less prominent. Also, more bearings are required, and the power factor will be lower since there will be a leakage flux inside the ring winding outside the airgaps.

A general challenge with the invention is to maintain the airgaps accurately. In one embodiment of the invention, illustrated in FIG. 14, this is accomplished by having bearings 60 located at the airgap 40, or even in the airgap 40, which positions the sections 12 of the first magnetic structure 10 relative to the sections 22 of the second magnetic structure 20. Thereby, the airgap 40 can be maintained without the need of large stiff structures that supports the sections 12 of the first magnetic structure 10 and the sections 22 of the second magnetic structure 20 and the respective sections can be kept separated. This solution is not standard, at least not for rotating machines, where there is normally a bearing located close to the rotational axis of the rotor. The bearings can be of any type such as ball bearings, roller bearings, track rollers, fluid bearings plain bearings, etc.

FIG. 15 shows an airgap 40 with alternative positions for the bearings 60, where the bearings are placed within a distance. At 60A, the bearings are placed outside the airgap, but within an airgap width distance 61. The airgap width distance 61 is the width of the airgap in the direction perpendicular to both the predetermined motion path and the closed path. At 60B, the bearings are located in the airgap, which relieves the mechanical stiffness requirements on the sections 12, 22, but interferes with the electromagnetic operation of the machine. At 60C, one of the bearings is removed, and the remaining bearing is placed near the center of the airgap. This reduces the number of bearings, but introduces more stiffness requirements on the machine. Finally, at 60D a large part of the airgap or the entire airgap is covered by the bearing. Typically, this is then a plain bearing. To summarize, at least one bearing 60 is located at or in a vicinity of at least one airgap 40, where the distance between the airgap 40 and the bearing 60 is less than the width 61 of said section surfaces 14, 16, 24, 26 at the airgap 40, or preferably less than half of the width 61 of the section surfaces at the airgap 40, where the width 61 is to be taken perpendicular to said predetermined motion path.

In embodiments where said predetermined motion path has a curvature, which is true for rotating machines, the pole length for said sections 12, 22 that are located on the inside of the curvature, closer to the center of curvature, need to have a shorter pole length than the sections 12, 22 that are located further away from the center of curvature to operate at the same frequency. Thereby, these poles can carry less magnetic flux than those located further away from the center of curvature, if they have the same said width 61 of said section surfaces. This may be a problem or a slight disadvantage for the performance of the machine, since the force then will become lower and the leakage flux higher. To compensate for this, the section widths 61 of the sections can be made larger for the sections that are located closer to the center of curvature. Optimally, the section widths 61 can be chosen to be inversely proportional to the distance between the center of curvature and the center of the section (12, 22) so that all sections can carry approximately the same amount of flux.

Since the technology presented here has very excellent performance in low speed applications, the use of machines according to the previous description in low-speed applications is advantageous. The most important application is probably direct drive generators and motors, but systems operating at characteristic speeds lower than 5 m/s are also believed to be particularly suitable. A characteristic speed is defined as a typical relative motion speed between a first and a second magnetic structure, e.g. a translator and a stator, or a rotor and a stator. Suitable applications are typically renewable energy conversion systems, wind power, tidal power, ocean wave power, electric ship propulsion, replacement of gear motors, i.e. in gearless motors, traction motors, direct drive systems in general, and force dense actuators.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] EP3325800A1

[2] Hagnestål, Anders, and Erling Guldbrandzén. "A highly efficient and low-cost linear TFM generator for wave power." EWTEC 2017: the 12th European Wave and Tidal Energy Conference 27 Aug.-1 Sep. 2017, Cork, Ireland. European Wave and Tidal Energy Conference, 2017.

[3] Hagnestål, A., 2016, "A low cost and highly efficient TFM generator for wave power," The 3rd Asian Wave and Tidal Energy Conference AWTEC, pp. 822-828

[4] Hagnestål, A., 2018, "On the Optimal Pole Width for Direct Drive Linear Wave Power Generators Using Ferrite Magnets," Energies, 11(6).

The invention claimed is:

1. An electrical machine operating by switching of magnetic flux, comprising:
   a first magnetic structure;
   a second magnetic structure; and
   a winding;
   wherein said first and second magnetic structures being arranged movable relative to each other along a predetermined motion path;
   wherein said first and second magnetic structures have, along a closed path perpendicular to said predetermined motion path, respective sections interleaved with each other via more than 4 air gaps, parallel to said predetermined motion path;
   wherein each section being defined as the part of the respective magnetic structure situated between, as seen along the direction of said closed path, section surfaces facing two consecutive ones of said more than 4 air gaps;
   wherein, for each section of said magnetic structures, magnetic field lines go through magnetic material between said section surfaces;
   wherein said first magnetic structure presents, in a direction parallel to said predetermined motion path at each air gap, a variable magnetic permeability;
   wherein said second magnetic structure presents, in said direction parallel to said predetermined motion path at each air gap, at least one of:
   a variable magnetic permeability;
   permanent magnet poles; and
   magnetic poles comprising superconducting material;
   wherein a first average distance determined as an average distance between consecutive maxima of said variable magnetic permeability of a section of said first magnetic structure is equal, within 35%, to a second average distance determined as an average distance between consecutive maxima of said variable magnetic permeability of a neighbouring section of said second magnetic structure or as an average distance between consecutive magnetic poles of a same polarity of said neighbouring section of said second magnetic structure;
   wherein, for each of said more than 4 air gaps, at at least one position at at least one operation phase, an average of a component of the magnetic flux density normal to said section surface at an airgap is larger than 15% of an average of an absolute value of said component of said magnetic flux density normal to said section surface, wherein said averages are to be taken over a uniform-flux distance, wherein said uniform-flux distance being an integer, larger than 3, times said first average distance along said respective air gap in said direction of said predetermined motion path;

wherein, for at least three of said sections of said magnetic structures, said winding having a respective loop provided either around respective section for at least said uniform-flux distance in said direction of said predetermined motion path, or along respective section along an entire closed said predetermined motion path.

2. The electrical machine according to claim 1, wherein magnetic field lines passing two consecutive said respective loop change their direction less than 150 degrees between the positions of said two consecutive loops.

3. The electrical machine according to claim 1, wherein said first magnetic structure is a stator.

4. The electrical machine according to claim 1, wherein said second magnetic structure is a stator.

5. The electrical machine according to claim 1, wherein said predetermined motion path a linear path, whereby said electrical machine is an azimuthal flux machine.

6. The electrical machine according to claim 1, wherein said predetermined motion path is a circular arc path, whereby said electrical machine is a poloidal flux machine.

7. The electrical machine according to claim 1, wherein said winding being wound non-perpendicular to said predetermined motion path around more than two sections of said first magnetic structure or more than two sections of said second magnetic structure.

8. The electrical machine according to claim 1, wherein each section of said first magnetic structure comprises stacks of first portions of magnetically highly permeable material, separated by non-magnetic material or slits, whereby said first average distance equals an average distance between two consecutive first portions of magnetically highly permeable material.

9. The electrical machine according to claim 8, wherein loops of said winding are wound parallel to said predetermined motion path encircling a plurality of consecutive said first portions of magnetically highly permeable material.

10. The electrical machine according to claim 1, wherein each section of said second magnetic structure comprises stacks of second portions of magnetically highly permeable material, separated by non-magnetic material or slits, whereby said second average distance equals an average distance between two consecutive second portions of magnetically highly permeable material.

11. The electrical machine according to claim 10, wherein loops of said winding are wound parallel to said predetermined motion path encircling a plurality of consecutive said second portions of magnetically highly permeable material.

12. The electrical machine according to claim 1, wherein at least one of said sections of said second magnetic structure comprises permanent magnets, arranged to present alternating poles along the surfaces facing said air gaps.

13. The electrical machine according to claim 12, wherein at least one of said sections of said second magnetic structure comprises stacks of second portions of magnetically highly permeable material, separated by non-magnetic material or slits, whereby said second average distance equals an average distance between two consecutive second portions of magnetically highly permeable material.

14. The electrical machine according to claim 12, wherein each section of said second magnetic structure comprises permanent magnets, arranged to present alternating poles along the surfaces facing said air gaps.

15. The electrical machine according to claim 12, wherein each section of said second magnetic structure that comprises permanent magnets comprises stacks, in said direction of said predetermined motion path, of permanent magnets with alternating magnetization directions parallel to said predetermined motion path, separated by portions of magnetically highly permeable material, whereby said second average distance equals an average distance between every second permanent magnet.

16. The electrical machine according to claim 15, wherein loops of said winding are wound parallel to said predetermined motion path encircling a plurality of consecutive said permanent magnets.

17. The electrical machine according to claim 1, further comprising at least one bearing located at or in a vicinity of at least one of said airgaps, wherein a distance between said one of said airgaps and said at least one bearing is less than a width of said section surfaces at said one of said airgaps, wherein said width is to be taken perpendicular to said predetermined motion path.

18. A system comprising an electrical machine according to claim 1, said system being selected among:
a renewable energy conversion system,
a wind power plant,
a tidal power plant,
an ocean wave power plant,
electric ship propulsion system,
a gearless motor,
a direct drive system, and
a force dense actuator.

19. The electrical machine according to claim 2, wherein said first magnetic structure is a stator.

20. The electrical machine according to claim 2, wherein said second magnetic structure is a stator.

* * * * *

UNITED STATES PATENT AND TRADEMARK OFFICE
CERTIFICATE OF CORRECTION

PATENT NO. : 11,728,717 B2
APPLICATION NO. : 17/428044
DATED : August 15, 2023
INVENTOR(S) : Anders Hagnestål Page 1 of 1

It is certified that error appears in the above-identified patent and that said Letters Patent is hereby corrected as shown below:

In the Claims

At Column 23, Line numbers 18-20, Claim number 5, should read "The electrical machine according to claim 1, wherein said predetermined motion path is a linear path, whereby said electrical machine is an azimuthal flux machine."

Signed and Sealed this
Twenty-sixth Day of September, 2023

Katherine Kelly Vidal
*Director of the United States Patent and Trademark Office*